(12) United States Patent
Polu et al.

(10) Patent No.: US 10,033,225 B2
(45) Date of Patent: Jul. 24, 2018

(54) WIRELESS ELECTRIC FIELD POWER TRANSMISSION SYSTEM, TRANSMITTER AND RECEIVER THEREFOR AND METHOD OF WIRELESSLY TRANSFERRING POWER

(71) Applicants: Nagesh Polu, Mount Pearl (CA); Michael Royle, Mount Pearl (CA)

(72) Inventors: Nagesh Polu, Mount Pearl (CA); Michael Royle, Mount Pearl (CA)

(73) Assignee: SOLACE POWER INC., Mount Pearl, NL (CA)

( * ) Notice: Subject to any disclaimer, the term of this patent is extended or adjusted under 35 U.S.C. 154(b) by 234 days.

(21) Appl. No.: 14/751,786

(22) Filed: Jun. 26, 2015

(65) Prior Publication Data

US 2015/0380946 A1 Dec. 31, 2015

Related U.S. Application Data

(60) Provisional application No. 62/017,330, filed on Jun. 26, 2014.

(51) Int. Cl.
*H02J 5/00* (2016.01)
*H01F 38/14* (2006.01)
(Continued)

(52) U.S. Cl.
CPC ............ *H02J 50/12* (2016.02); *H01F 38/14* (2013.01); *H02J 5/005* (2013.01); *H02J 7/025* (2013.01);
(Continued)

(58) Field of Classification Search
CPC .... H01F 38/14; H01F 2038/146; H02J 5/005; H02J 7/025; H02J 17/00; H02J 50/05;
(Continued)

(56) References Cited

U.S. PATENT DOCUMENTS 3,876,980 A 4/1975 Haemmig et al.
3,984,807 A 10/1976 Haemmig
(Continued)

FOREIGN PATENT DOCUMENTS

AU 2011232776 A1 10/2011
CN 101416411 A 4/2009
(Continued)

OTHER PUBLICATIONS

Pre-Examination Notice for corresponding Australian Application No. 2012306994 dated Feb. 29, 2016.
(Continued)

*Primary Examiner* — Levi Gannon
(74) *Attorney, Agent, or Firm* — Harness, Dickey & Pierce, P.L.C.

(57) ABSTRACT

A wireless electric field power transmission system comprises a transmitter comprising a transmit resonator and a transmit capacitive balun, and at least one receiver comprising a receive resonator and a receive capacitive balun. The transmit capacitive balun is configured to transfer power to the transmitter resonator, the transmit resonator is configured to transfer the power to the receive resonator, and the receive resonator is configured to extract the power to the receive capacitive balun via electric field coupling.

23 Claims, 19 Drawing Sheets

US 10,033,225 B2

Page 2

(51) Int. Cl.
   *H02J 50/12* (2016.01)
   *H02J 50/05* (2016.01)
   *H02J 7/02* (2016.01)
   *H02J 17/00* (2006.01)

(52) U.S. Cl.
   CPC .............. *H02J 17/00* (2013.01); *H02J 50/05* (2016.02); *H01F 2038/146* (2013.01)

(58) Field of Classification Search
   CPC ........ H02J 50/10; H02J 50/12; H04B 5/0037; H04B 5/0075
   USPC ........................................................ 307/104
   See application file for complete search history.

(56) References Cited

U.S. PATENT DOCUMENTS

| | | | |
|---|---|---|---|
| 4,034,298 A | 7/1977 | McFadyen et al. |
| 4,083,003 A | 4/1978 | Haemmig |
| 4,757,290 A | 7/1988 | Keren |
| 4,805,232 A | 2/1989 | Ma |
| 4,821,291 A | 4/1989 | Stevens et al. |
| 5,061,910 A | 10/1991 | Bouny |
| 5,437,057 A | 7/1995 | Richley et al. |
| 5,557,290 A | 9/1996 | Watanabe |
| 5,621,323 A * | 4/1997 | Larsen ............... G01R 33/3678 324/318 |
| 5,701,121 A | 12/1997 | Murdoch |
| 6,194,993 B1 | 2/2001 | Hayashi et al. |
| 6,591,139 B2 | 7/2003 | Loftin et al. |
| 6,608,291 B1 | 8/2003 | Collins et al. |
| 6,879,809 B1 | 4/2005 | Vega et al. |
| 7,356,952 B2 | 4/2008 | Sweeney et al. |
| 7,519,328 B2 | 4/2009 | Dokai et al. |
| 7,567,824 B2 | 7/2009 | Mickle et al. |
| 7,595,732 B2 | 9/2009 | Shameli et al. |
| 7,668,528 B2 | 2/2010 | Rofougaran et al. |
| 7,825,543 B2 | 11/2010 | Karalis et al. |
| 7,915,874 B1 | 3/2011 | Cuk |
| 7,925,308 B2 | 4/2011 | Greene et al. |
| 8,024,012 B2 | 9/2011 | Clevenger et al. |
| 8,035,255 B2 | 10/2011 | Kurs et al. |
| 8,061,864 B2 | 11/2011 | Metcalf et al. |
| 8,076,801 B2 | 12/2011 | Karalis et al. |
| 8,121,540 B1 | 2/2012 | Johnson et al. |
| 8,169,185 B2 | 5/2012 | Partovi et al. |
| 8,294,300 B2 | 10/2012 | Cook et al. |
| 8,305,217 B2 | 11/2012 | Arimura |
| 8,487,478 B2 | 7/2013 | Kirby et al. |
| 8,517,126 B2 * | 8/2013 | Atarashi ............ B60L 5/005 180/2.1 |
| 8,536,739 B2 | 9/2013 | Ichikawa et al. |
| 8,878,393 B2 | 11/2014 | Kirby et al. |
| 8,922,066 B2 | 12/2014 | Kesler et al. |
| 8,933,589 B2 | 1/2015 | Bourilkov et al. |
| 9,054,745 B2 | 6/2015 | Moon et al. |
| 9,142,998 B2 | 9/2015 | Yu et al. |
| 9,161,160 B2 | 10/2015 | Ikemoto et al. |
| 9,172,276 B2 | 10/2015 | Ichikawa et al. |
| 2002/0097107 A1 * | 7/2002 | Burns ..................... H01P 5/10 333/26 |
| 2002/0160722 A1 | 10/2002 | Terranova et al. |
| 2003/0233288 A1 | 12/2003 | Sweeney et al. |
| 2004/0140941 A1 | 7/2004 | Joy et al. |
| 2005/0007067 A1 | 1/2005 | Baarman et al. |
| 2005/0110641 A1 | 5/2005 | Mendolia et al. |
| 2005/0143023 A1 | 6/2005 | Shih |
| 2006/0113955 A1 | 6/2006 | Nunally |
| 2006/0205381 A1 | 9/2006 | Beart et al. |
| 2006/0281435 A1 | 12/2006 | Shearer et al. |
| 2007/0010295 A1 | 1/2007 | Greene et al. |
| 2007/0164414 A1 | 7/2007 | Dokai et al. |
| 2007/0191075 A1 | 8/2007 | Greene et al. |
| 2007/0222542 A1 | 9/2007 | Joannopoulos et al. |
| 2008/0202003 A1 | 8/2008 | Sweeney et al. |
| 2008/0211320 A1 | 9/2008 | Cook et al. |
| 2008/0265684 A1 | 10/2008 | Farkas |
| 2009/0021374 A1 | 1/2009 | Stagg |
| 2009/0045772 A1 | 2/2009 | Cook et al. |
| 2009/0058189 A1 | 3/2009 | Cook et al. |
| 2009/0089146 A1 | 4/2009 | Teterin |
| 2009/0134712 A1 | 5/2009 | Cook et al. |
| 2009/0160261 A1 | 6/2009 | Elo |
| 2009/0206675 A1 | 8/2009 | Camurati et al. |
| 2009/0218884 A1 | 9/2009 | Soar |
| 2009/0243397 A1 | 10/2009 | Cook et al. |
| 2009/0251008 A1 | 10/2009 | Sugaya |
| 2009/0284082 A1 | 11/2009 | Mohammadian |
| 2009/0284083 A1 | 11/2009 | Karalis et al. |
| 2009/0299918 A1 | 12/2009 | Cook et al. |
| 2009/0302690 A1 | 12/2009 | Kubono et al. |
| 2009/0303693 A1 | 12/2009 | Mao |
| 2010/0045114 A1 | 2/2010 | Sample et al. |
| 2010/0081379 A1 | 4/2010 | Cooper et al. |
| 2010/0109445 A1 | 5/2010 | Kurs et al. |
| 2010/0148723 A1 | 6/2010 | Cook et al. |
| 2010/0192444 A1 | 8/2010 | Cabahug et al. |
| 2010/0201189 A1 | 8/2010 | Kirby et al. |
| 2010/0201312 A1 | 8/2010 | Kirby et al. |
| 2010/0210233 A1 | 8/2010 | Cook et al. |
| 2010/0277121 A1 | 11/2010 | Hall et al. |
| 2011/0018498 A1 | 1/2011 | Soar |
| 2011/0057742 A1 * | 3/2011 | Frye ..................... H01P 5/10 333/26 |
| 2011/0084656 A1 | 4/2011 | Gao |
| 2011/0090030 A1 * | 4/2011 | Pagani ................. H04B 5/0012 333/24 R |
| 2011/0109167 A1 | 5/2011 | Park et al. |
| 2011/0121658 A1 | 5/2011 | Fukada |
| 2011/0140429 A1 | 6/2011 | Bohori et al. |
| 2011/0169338 A1 | 7/2011 | Kozakai |
| 2011/0198939 A1 | 8/2011 | Karalis et al. |
| 2011/0234019 A1 | 9/2011 | Camurati et al. |
| 2011/0235800 A1 | 9/2011 | Furukawa et al. |
| 2011/0241436 A1 | 10/2011 | Furukawa |
| 2011/0266881 A1 | 11/2011 | Kim et al. |
| 2011/0266995 A1 | 11/2011 | Winfield et al. |
| 2011/0267127 A1 | 11/2011 | Staszewski et al. |
| 2011/0281535 A1 | 11/2011 | Low et al. |
| 2011/0316347 A1 | 12/2011 | Endo et al. |
| 2012/0001485 A1 | 1/2012 | Uchida |
| 2012/0001496 A1 | 1/2012 | Yamamoto et al. |
| 2012/0001497 A1 | 1/2012 | Sada et al. |
| 2012/0010079 A1 | 1/2012 | Sedwick |
| 2012/0019057 A9 | 1/2012 | Kirby et al. |
| 2012/0043887 A1 | 2/2012 | Mesibov |
| 2012/0049645 A1 | 3/2012 | Kozakai |
| 2012/0056485 A1 | 3/2012 | Haruyama |
| 2012/0056579 A1 | 3/2012 | Kim et al. |
| 2012/0062039 A1 | 3/2012 | Kamata et al. |
| 2012/0062174 A1 | 3/2012 | Kamata |
| 2012/0068548 A1 | 3/2012 | Endo et al. |
| 2012/0095531 A1 | 4/2012 | Derbas et al. |
| 2012/0098330 A1 | 4/2012 | Ichikawa et al. |
| 2012/0104997 A1 | 5/2012 | Carobolante |
| 2012/0146431 A1 | 6/2012 | Ichikawa et al. |
| 2012/0153733 A1 | 6/2012 | Schatz et al. |
| 2012/0223586 A1 | 9/2012 | Gotani |
| 2013/0009488 A1 | 1/2013 | Choe et al. |
| 2013/0015699 A1 | 1/2013 | Mita |
| 2013/0147427 A1 | 6/2013 | Polu et al. |
| 2013/0187475 A1 | 7/2013 | Vendik et al. |
| 2013/0187598 A1 | 7/2013 | Park et al. |
| 2013/0260803 A1 | 10/2013 | Ikemoto et al. |
| 2014/0021907 A1 | 1/2014 | Yu et al. |
| 2014/0167525 A1 | 6/2014 | Van Goor et al. |
| 2014/0203663 A1 | 7/2014 | Waffenschmidt et al. |
| 2014/0368056 A1 * | 12/2014 | Hosotani ............. H02J 5/005 307/104 |
| 2015/0002195 A1 | 1/2015 | Englekirk |
| 2015/0077197 A1 | 3/2015 | Kushita et al. |
| 2015/0102941 A1 | 4/2015 | Keech et al. |
| 2015/0333538 A1 | 11/2015 | Kusunoki et al. |
| 2015/0333539 A1 | 11/2015 | Kusunoki et al. |

(56) References Cited

U.S. PATENT DOCUMENTS

| | | |
|---|---|---|
| 2015/0372540 A1 | 12/2015 | Takahashi et al. |
| 2016/0099651 A1 | 4/2016 | Ishigaki |
| 2016/0308403 A1 | 10/2016 | Bluvshtein et al. |
| 2017/0140869 A1 | 5/2017 | Costanzo et al. |

FOREIGN PATENT DOCUMENTS

| | | |
|---|---|---|
| CN | 102104284 A | 6/2011 |
| DE | 10 2007 003458 A1 | 7/2008 |
| EP | 0558316 A1 | 9/1993 |
| JP | H06150079 A | 5/1994 |
| JP | 2001218371 A | 8/2001 |
| JP | 2008193499 A | 8/2008 |
| JP | 2009296857 A | 12/2009 |
| JP | 2012039874 A | 2/2012 |
| JP | 2014-107883 A | 6/2014 |
| KR | 20120048306 A | 5/2012 |
| WO | WO-2009089146 A1 | 7/2009 |
| WO | WO-2010093719 A1 | 8/2010 |
| WO | WO-11077493 A1 | 6/2011 |
| WO | WO-2013033834 A1 | 3/2013 |
| WO | WO-2013/108893 A1 | 7/2013 |

OTHER PUBLICATIONS

Office Action for corresponding Singapore Application No. 11201400409X dated Nov. 28, 2014.
Office Action for corresponding Singapore Application No. 11201400409X dated Jun. 19, 2015.
New Zealand Examination Report for Application No. 623200 dated Aug. 5, 2015.
Office Action for corresponding European Application No. 12829237.2 dated Aug. 20, 2015.
New Zealand Examination Report for Application No. 623200 dated Aug. 28, 2014.
Roy Want: "The Magic of RFID" [online] vol. 2, No. 7, Oct. 2004, pp. 40-48.
"What is a Ground (Earth) Loop," Sound on Sound, Aug. 2006.
Jiang et al ("A Class-B Push-Pull Power Amplifier Based on an Extended Resonance Technique," IEEE Microwave and Wireless Components Letters, vol. 13, No. 12, Dec. 2003).
Motorola ("Motorola Razr v3i GSM," Motomanual, Motorola Inc. 2006, calculator: pp. 7, 79, 80, 104; GPRS p. 38; Radio reciever: p. 84, 88, 94, 95, 96).
"Electromagnetic Radiation and how it affects your instruments," Field Service Memo, May 1990, OSHA Cincinnati Laboratory.
International Search Report PCT/ISA/210 for International Application No. PCT/CA2015/050605 dated Sep. 11, 2015.
Written Opinion of the International Searching Authority PCT/ISA/237 for International Application No. PCT/CA2015/050605 dated Sep. 11, 2015.
Written Opinion of the International Searching Authority PCT/ISA/237 for International Application No. PCT/CA2015/050855 dated Nov. 5, 2015.
International Search Report PCT/ISA/210 for International Application No. PCT/SE2015/050855 dated Nov. 5, 2015.
Office Action for corresponding U.S. Appl. No. 13/607,474 dated Nov. 4, 2015.
Office Action for corresponding U.S. Appl. No. 13/607,474 dated May 8, 2015.
Office Action for corresponding U.S. Appl. No. 13/607,474 dated Dec. 5, 2014.
U.S. Appl. No. 13/607,474, filed Sep. 7, 2012.
U.S. Appl. No. 14/747,588, filed Jun. 23, 2015.
U.S. Appl. No. 14/846,152, filed Sep. 4, 2015.
Office Action for corresponding U.S. Appl. No. 13/607,474 dated Oct. 18, 2016.
Examination Report for corresponding New Zealand Application No. 623200 dated Jan. 18, 2016.
Written Opinion for corresponding Singapore Application No. 11201400409X dated Jan. 13, 2016.
International Search Report and Written Opinion dated Jan. 10, 2013.
"Motomanual Razr V3i GSM," Motorola.com, Motorola Inc., 2006.
Office Action for corresponding U.S. Appl. No. 13/607,474 dated Dec. 16, 2016.
Notice of Allowance for corresponding U.S. Appl. No. 13/607,474 dated Feb. 15, 2017.
Office Action for Australian Application No. 2012306994 dated Jul. 1, 2016.
Office Action for New Zealand Application No. 719870 dated Jun. 9, 2016.
International Search Report and Written Opinion for Application No. PCT/CA2016/050494 dated Jun. 20, 2016.
Office Action for corresponding New Zealand Application No. 719870 dated Sep. 13, 2016.
Office Action for corresponding Japanese Application No. 2014-528811 dated Aug. 16, 2016 and English translation thereof.
Office Action for corresponding Chinese Application No. 201280053727.5 dated Nov. 3, 2015 and English translation thereof.
Office Action for corresponding U.S. Appl. No. 13/607,474 dated Apr. 8, 2016.
New Zealand Examination Report for Application No. 731948 dated Jun. 23, 2017.
Office Action for corresponding U.S. Appl. No. 14/747,588 dated May 8, 2017.
Office Action for corresponding U.S. Appl. No. 14/846,152 dated Jun. 21, 2017.
Office Action for corresponding U.S. Appl. No. 14/846,152 dated Nov. 14, 2017.
Singapore Search Report and Written Opinion for Application No. 11201610806Q dated Nov. 30, 2017.
Office Action for corresponding U.S. Appl. No. 14/747,588 dated Sep. 28, 2017.
Extended European Search Report for European Patent Application No. 15811214.4 dated Feb. 9, 2018.
Extended European Search Report for European Patent Application No. 15838917.1 dated Feb. 28, 2018.
Office Action for corresponding U.S. Appl. No. 14/747,588 dated Mar. 12, 2018.

* cited by examiner

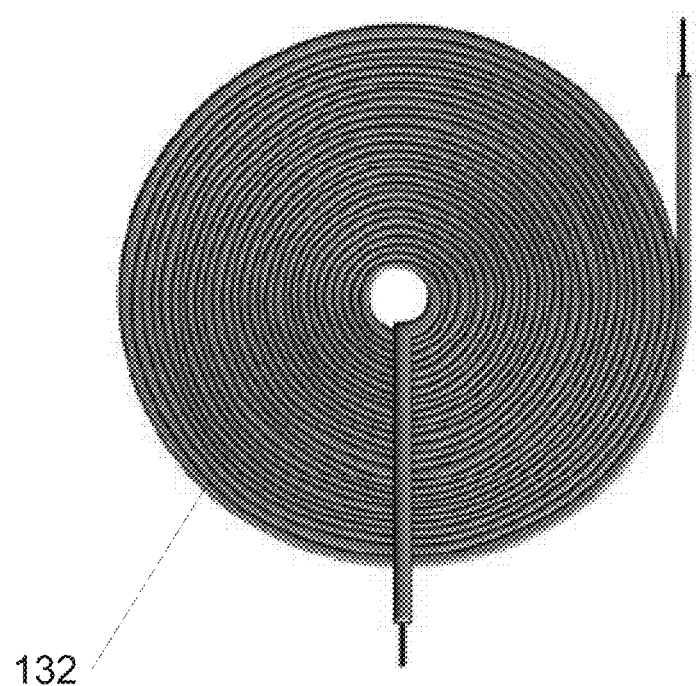
132
Figure 4a
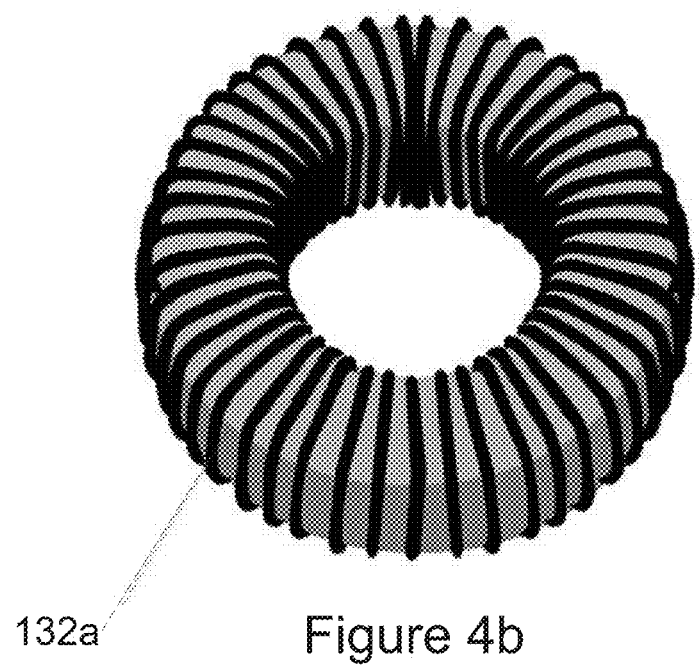
132a    Figure 4b

132b

WIRELESS ELECTRIC FIELD POWER TRANSMISSION SYSTEM, TRANSMITTER AND RECEIVER THEREFOR AND METHOD OF WIRELESSLY TRANSFERRING POWER

CROSS REFERENCE TO RELATED APPLICATION

This application claims the benefit of U.S. Provisional Application No. 62/017,330 filed on Jun. 26, 2014 and is related to U.S. patent application Ser. No. 13/607,474 filed on Sep. 7, 2012, the entire contents of which are incorporated herein by reference.

FIELD

The subject application relates generally to wireless power transmission and in particular, to a wireless electric field power transmission system, a transmitter and receiver therefor and a method of wirelessly transferring power.

BACKGROUND

A variety of radiative or far-field, and non-radiative or near-field, energy or power transfer techniques are known. For example, radiative wireless information transfer using low-directionality antennas, such as those used in radio and cellular communications systems and home computer networks, may be considered wireless energy transfer. As will be appreciated, this type of radiative energy transfer is inefficient because only a small portion of the supplied or radiated power, namely, that portion in the direction of, and overlapping with, the receiver is picked up. The vast majority of the power is radiated in other directions and lost in free space. Such inefficient energy transfer may be acceptable for data transmission, but is not practical when trying to transfer useful amounts of electrical energy for the purpose of doing work, such as for example, powering or charging electrical or electronic devices. One way to improve the transfer efficiency of some radiative energy transfer schemes is to use directional antennas to confine and preferentially direct a beam of radiated energy towards a receiver. However, these directed radiation schemes typically require an uninterruptible line-of-sight between the transmitter and receiver as well as potentially complicated tracking and steering mechanisms in the case of mobile transmitters and/or receivers. In addition, such directed radiation schemes may pose hazards to objects or people that cross or intersect the beam of radiated energy when modest to high power beams of energy are being transmitted.

A known non-radiative, or near-field, wireless power transmission system, often referred to as either induction or traditional induction, does not (intentionally) radiate power, but instead uses an alternating current passing through a primary coil, to generate an alternating magnetic near-field that induces currents in a near-by receiving or secondary coil. Induction schemes of this nature have demonstrated the ability to transmit modest to large amounts of power, however only over very short distances, and with very small offset tolerances between the primary coil and the secondary coil. Electric transformers and proximity chargers are examples of devices that utilize this known short range, near-field energy transfer scheme.

PCT Application Publication No. WO 2009/089146 discloses a wireless power transmission system that includes a transmitter and a receiver. The transmitter includes a radio frequency energy generator, a first transmitting plate, and a second transmitting plate. The first transmitting plate is operatively coupled to the radio frequency energy generator. The second transmitting plate is operatively coupled to ground. The receiver includes a rectifier, a first receiving plate, and a second receiving plate. The first receiving plate is operatively coupled to the rectifier. The first receiving plate is configured to be capacitively coupled to the first transmitting plate and the second receiving plate is configured to be capacitively coupled to the second transmitting plate. The second receiving plate is operatively coupled to ground.

U.S. Patent Application Publication No. 20110198939 discloses a transmitter that includes a substantially two-dimensional high-Q resonator structure including a flat coil and an impedance-matching structure operably connected to the resonator structure. The transmitter is configured to transmit power wirelessly to another high-Q resonator.

U.S. Patent Application Publication No. 20090206675 discloses means for transporting electrical energy and/or information from a distance by using, at a slowly varying regime, the Coulomb field which surrounds any set of charged conductors. A device is composed of energy production and consumption devices situated a short distance apart, and it uses neither the propagation of electromagnetic waves nor induction and cannot be reduced to a simple arrangement of electrical capacitors. The device is modeled in the form of an interaction between oscillating asymmetric electric dipoles, consisting of a high-frequency high-voltage generator or of a high-frequency high-voltage load placed between two electrodes. The dipoles exert a mutual influence on one another. The device is suitable for powering industrial and domestic electrical apparatus and is especially suitable for powering low-power devices moving in an environment and for short-distance non-radiating transmission of information.

Although wireless power transmission techniques are known, improvements are desired. It is therefore an object to provide a novel wireless electric field power transmission system, a transmitter and receiver therefor and a method of wirelessly transmitting power.

SUMMARY

Accordingly, in one aspect there is provided a wireless electric field power transmission system comprising: a transmitter comprising a transmit resonator and a transmit capacitive balun; and at least one receiver comprising a receive resonator and a receive capacitive balun, wherein, via electric field coupling: the transmit capacitive balun is configured to transfer power to the transmit resonator, in response, the transmit resonator is configured to transfer power to the receive resonator, and the receive capacitive balun is configured to extract power from the receive resonator.

According to another aspect there is provided a method of wirelessly transferring power, the method comprising: delivering power from a source to a transmit resonator via a transmit capacitive balun via electric field coupling; in response, transferring power from the transmit resonator to a receive resonator via electric field coupling; and extracting power from the receive resonator via a receive capacitive balun via electric field coupling.

According to another aspect there is provided a transmitter for wirelessly transferring power, the transmitter comprising: a capacitive balun configured to receive an alternating signal and in response generate an electric field; and a transmit resonator, responsive to the electric field generated by the capacitive balun, configured to resonate and generate an electric field to a receiver.

The transmit resonator may, responsive to the electric field generated by the capacitive balun, be configured to resonate and generate a resonant electric field to the receiver. The capacitive balun and the transmit resonator may, responsive to the electric field generated by the capacitive balun, be configured to resonate and generate a resonant electric field to the receiver. The capacitive balun may be configured to receive the alternating signal and in response generate a resonant electric field. The transmit resonator may, responsive to the resonant electric field generated by the capacitive balun, be configured to resonate and generate the electric field to the receiver. The transmit resonator may, responsive to the resonant electric field generated by the capacitive balun, be configured to resonate and generate a resonant electric field to the receiver.

The transmit resonator may comprise laterally spaced electrodes interconnected by a series inductor and the capacitive balun may comprise laterally spaced conductive elements, each conductive element being proximate to and spaced from at least one respective electrode. The conductive elements and electrodes may be in substantial alignment so that major faces of the conductive elements and electrodes face one another. The conductive elements and electrodes may also be generally planar and may have substantially similar dimensions. Alternatively, the conductive elements and electrodes may be of different dimensions and may be curved, angled and/or textured.

The transmitter may also further comprise a power inverter connected across the capacitive balun, the power inverter configured to output the alternating signal that excites the capacitive balun.

The transmitter may also further comprise a source configured to generate the alternating signal that excites the capacitive balun.

The alternating signal may be a radiofrequency (RF) signal.

According to another aspect, there is provided a receiver for wirelessly receiving power, the receiver comprising: a receive resonator configured to resonate in the presence of a generated electric field; and a capacitive balun capacitively coupled to the receive resonator and configured to output an alternating signal in response to resonance of the receive resonator.

The receive resonator may be configured to resonate in the presence of a generated resonant electric field. The receive resonator may, responsive to the generated resonant electric field, be configured to resonate and generate an electric field. The receive resonator may, responsive to the generated resonant electric field, be configured to resonate and generate a resonant electric field. The receive resonator and the capacitive balun may, responsive to the resonant electric field generated by the receive resonator, be configured to resonate and generate a resonant electric field.

The receive resonator and the capacitive balun may, responsive to the generated electric field, be configured to resonate and generate a resonant electric field.

The receive resonator may comprise laterally spaced electrodes interconnected by a series inductor and the capacitive balun may comprise laterally spaced conductive elements, each conductive element being proximate to and spaced from at least one respective electrode. The conductive elements and electrodes may be in substantial alignment so that major faces of the conductive elements and electrodes face one another. The conductive elements and electrodes may also be generally planar and may have substantially similar dimensions. Alternatively, the conductive elements and electrodes may be of different dimensions and may be curved, angled and/or textured.

The receiver may further comprise a rectifier configured to convert the alternating signal to a direct current signal and a regulator configured to regulate the direct current signal.

BRIEF DESCRIPTION OF THE DRAWINGS

Embodiments will now be described more fully with reference to the accompanying drawings in which:

FIG. 4a is a top plan view of a series transmit inductor forming part of the wireless electric field power transmission system of FIG. 2;

FIG. 4b is a perspective view of another embodiment of a series transmit inductor;

DETAILED DESCRIPTION OF EMBODIMENTS

Figure 1:
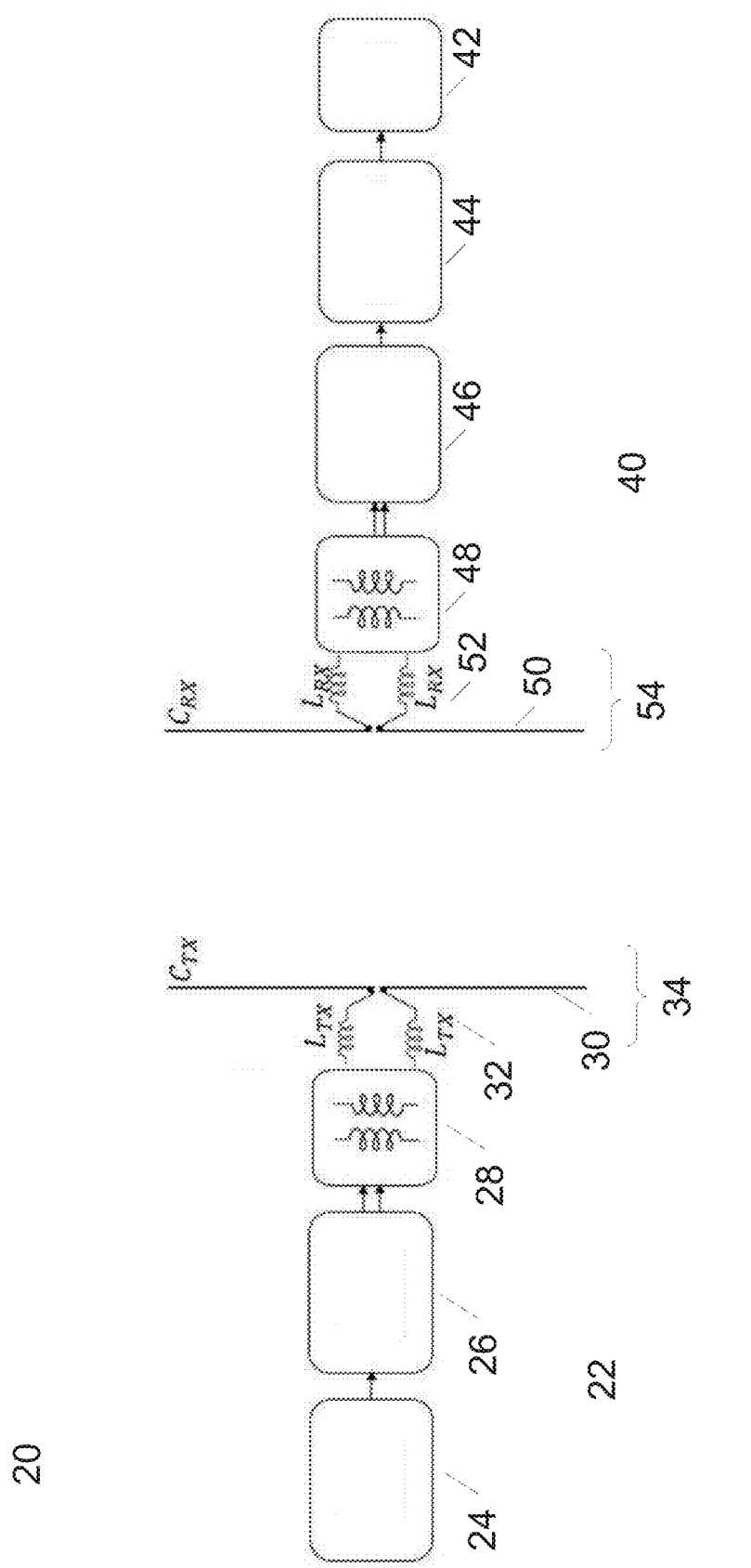
FIG. 1 is a schematic layout view of a wireless electric field power transmission system.

Turning now to FIG. 1, a wireless electric field power transmission system is shown and is generally identified by reference numeral 20. As can be seen, wireless electric field power transmission system 20 comprises a transmitter 22 and a receiver 40 spaced apart from the transmitter 22. The transmitter 22 comprises a power source 24 electrically connected to a power inverter 26, which in turn is electrically connected across an inductive transmit balun 28. The transmitter 22 further comprises capacitive transmit electrodes ($C_{TX}$) 30, each of which is electrically connected to the inductive transmit balun 28 by a respective series inductor ($L_{TX}$) 32. The capacitive transmit electrodes ($C_{TX}$) 30 are resonated with the series inductors ($L_{TX}$) 32 at a particular operating frequency ($f_s$) to form a transmit resonator generally identified by reference numeral 34. The power inverter 26 outputs a radio frequency (RF) signal at operating frequency ($f_s$) that excites the transmit resonator 34 via the inductive transmit balun 28 causing the transmit resonator 34 to generate a resonant electric field. The inductive transmit balun 28 interconnects unbalanced and balanced systems and performs impedance transformation.

The receiver 40 comprises a load 42 electrically connected to a regulator 44, which in turn is electrically connected to a radio-frequency to direct current (RF-DC) rectifier 46. The RF-DC rectifier 46 is electrically connected across an inductive receive balun 48. Similar to the inductive transmit balun 28, the inductive receive balun 48 interconnects unbalanced and balanced systems and performs impedance transformation. In this embodiment, the RF-DC rectifier 46 employs ultra-fast diodes that have a low junction capacitance, a high reverse breakdown voltage and a low forward voltage drop. The RF-DC rectifier 46 may also employ synchronous MOSFETs (metal-oxide-semiconductor field-effect transistors).

The load 42 may take many forms such as those identified in above-incorporated U.S. patent application Ser. No. 13/607,474. Further exemplary loads 42 include, but are not limited to: batteries (e.g. AA, 9V and non-traditional or custom rechargeable battery formats), radio communication devices, computer batteries (e.g. desktop, laptop and tablet), phones (e.g. cordless, mobile and cellular), television sets or display panels (e.g. Plasma, LCD, LED and OLED) and home electronics (e.g. DVD players, Blu-ray players, receivers, amplifiers, all-in-one home theatre, speakers, sub-woofers, video game consoles, video game controllers, remote control devices, televisions, computers or other monitors, digital cameras, video cameras, digital photo frames, video or image projectors and media streaming devices).

The receiver 40 further comprises capacitive receive electrodes ($C_{RX}$) 50, each of which is electrically connected to the inductive receive balun 48 by a respective series inductor ($L_{RX}$) 52. When the capacitive receive electrodes 50 are exposed to the resonant electric field generated by the transmit resonator 34, the capacitive receive electrodes ($C_{RX}$) 50 are resonated with the series inductor ($L_{RX}$) 52 at the same operating frequency ($f_s$) as the transmit resonator 34 to form a receive resonator generally identified by reference numeral 54.

In this embodiment, the inductive transmit and receive baluns 28 and 48, respectively, comprise a ferrite core and have a turn ratio of slightly higher than 1:1 for impedance matching purposes. Although these baluns perform well, they disadvantageously require significant physical space. Furthermore, these baluns are intrinsically limited in operating frequency and power levels. In addition, at higher power levels, these baluns heat up increasing the risk of damage to the baluns or other components of the wireless electric field power transmission system.

Figure 2:
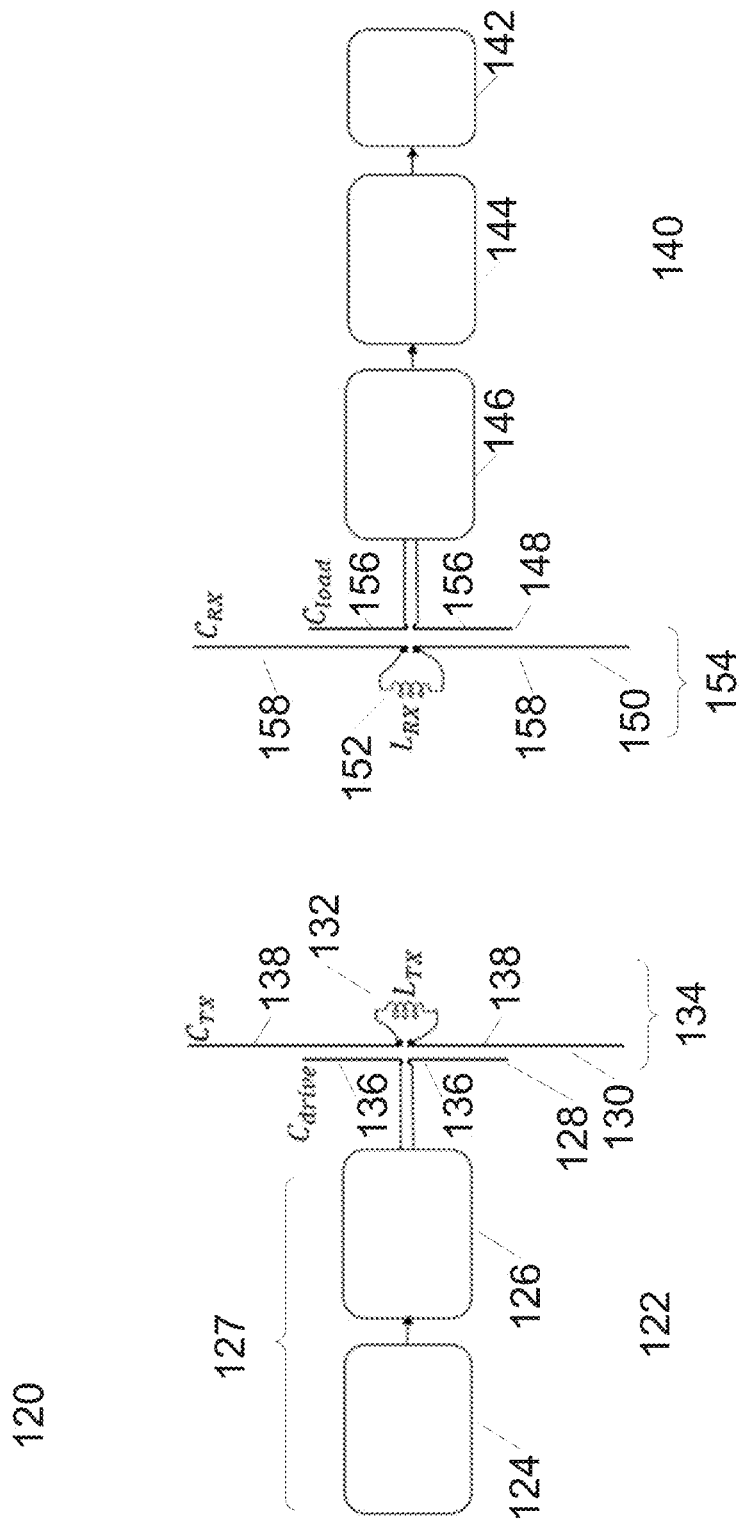
FIG. 2 is a schematic layout view of another wireless electric field power transmission system.

Turning now to FIG. 2, an alternative wireless electric field power transmission system 120 is shown. As can be seen, wireless electric field power transmission system 120 comprises a transmitter 122 and a receiver 140 spaced apart from the transmitter 122. The transmitter 122 comprises a power source 124 electrically connected to a power inverter 126, which in turn is electrically connected across a capacitive transmit balun ($C_{drive}$) 128. Collectively, the power source 124 and power inverter 126 form an RF source 127. The transmitter 122 further comprises capacitive transmit electrodes ($C_{TX}$) 130 that are electrically connected by a series transmit inductor ($L_{TX}$) 132 and that are capacitively coupled to the capacitive transmit balun 128. The capacitive transmit electrodes 130 are resonated with the series transmit inductor 132 at a particular operating frequency ($f_s$) to form a transmit resonator generally identified by reference numeral 134.

The receiver 140 comprises a load 142 electrically connected to a regulator 144, which in turn is electrically connected to an RF-DC rectifier 146. The RF-DC rectifier 146 is electrically connected across a capacitive receive balun ($C_{load}$) 148. Similar to the previous embodiment, the RF-DC rectifier 146 employs ultra-fast diodes that have a low junction capacitance, a high reverse breakdown voltage and a low forward voltage drop. The RF-DC rectifier 146 may also employ synchronous MOSFETs (metal-oxide-semiconductor field-effect transistors). The load 142 may take many forms such as those identified in above-incorporated U.S. patent application Ser. No. 13/607,474. Further exemplary loads 142 include, but are not limited to: batteries (e.g. AA, 9V and non-traditional or custom rechargeable battery formats), radio communication devices, computer batteries (e.g. desktop, laptop and tablet), phones (e.g. cordless, mobile and cellular), television sets or display panels (e.g. Plasma, LCD, LED and OLED) and home electronics (e.g. DVD players, Blu-ray players, receivers, amplifiers, all-in-one home theatre, speakers, sub-woofers, video game consoles, video game controllers, remote control devices, televisions, computers or other monitors, digital cameras, video cameras, digital photo frames, video or image projectors and media streaming devices).

The receiver 140 further comprises capacitive receive electrodes ($C_{RX}$) 150 that are electrically connected by a series receive inductor ($L_{RX}$) 152 and that are capacitively coupled to the capacitive receive balun 148. The capacitive receive electrodes 150 are resonated with the series receive inductor 152 at the particular operating frequency ($f_s$) to form a receive resonator generally identified by reference numeral 154.

Figure 3:
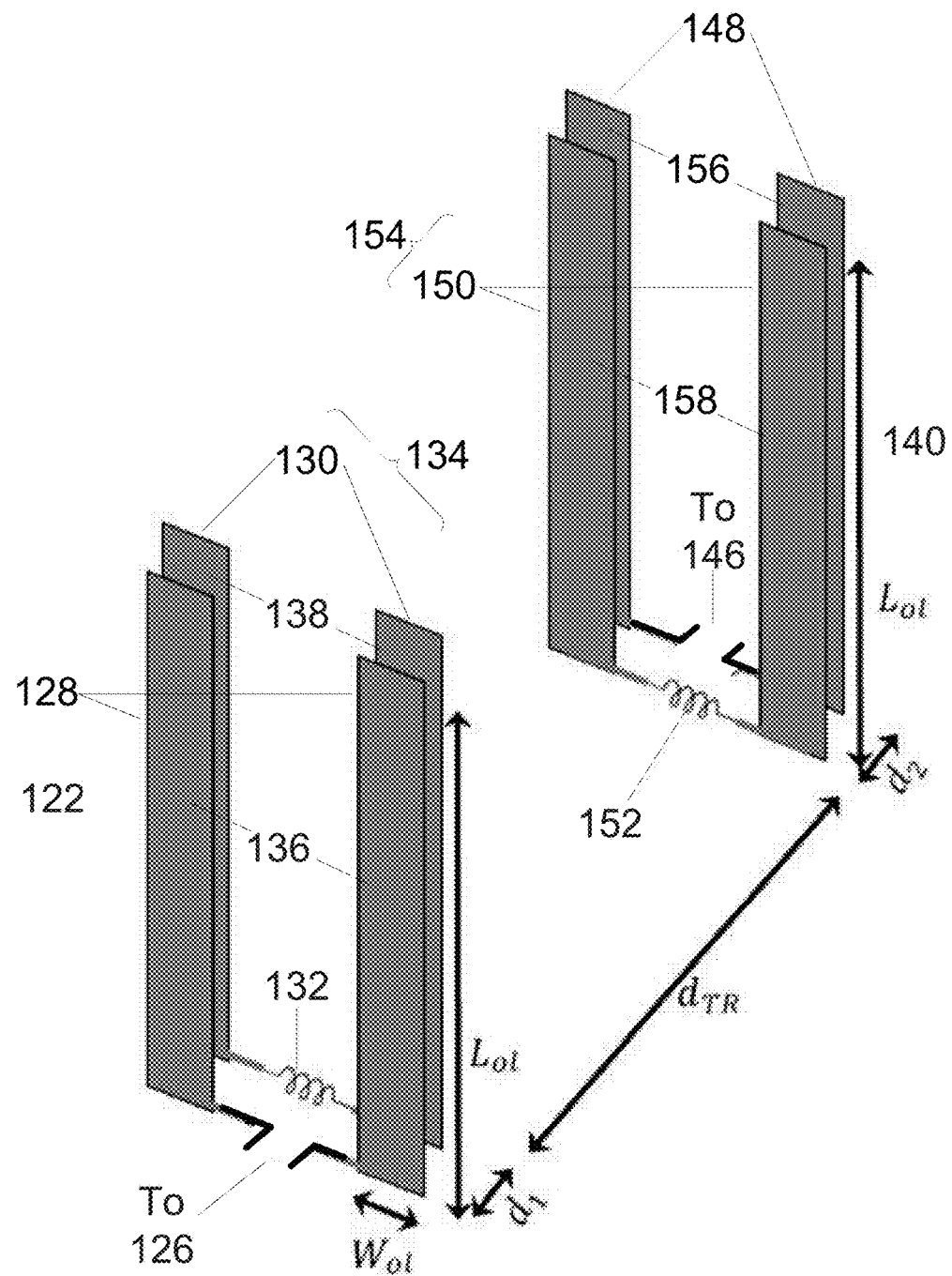
FIG. 3 is a perspective view of a transmit balun, transmit resonator, receive balun and receive resonator arrangement forming part of the wireless electric field power transmission system of FIG. 2.

Turning now to FIG. 3, the capacitive transmit balun 128, transmit resonator 134, capacitive receive balun 148 and receive resonator 154 are better illustrated. The transmitter 122 and receiver 140 are spaced apart by a distance $d_{TR}$. In this embodiment, the capacitive transmit balun 128 comprises a pair of laterally spaced, elongate elements formed of electrically conductive material. The conductive elements are in the form of generally rectangular, planar plates. The capacitive transmit electrodes 130 of the transmit resonator 134 are also in the form of elongate generally rectangular, planar plates formed of electrically conductive material. Each plate of the capacitive transmit balun 128 is proximate to and aligned with a respective capacitive transmit electrode 130 so that major surfaces 136 and 138 of the plates and capacitive transmit electrodes 130 face one another and are separated by a distance $d_1$. In this embodiment, the areas of the major surfaces 136 and 138 are equal or near-equal, that is the dimensions of the plates of the capacitive transmit balun 128 and the capacitive transmit electrodes 130 are basically the same.

The capacitive receive balun 148 comprises a pair of laterally spaced, elongate elements formed of electrically conductive material. The conductive elements are in the form of generally rectangular, planar plates. The capacitive receive electrodes 150 of receive resonator 154 are also in the form of elongate generally rectangular, planar plates formed of electrically conductive material. Each plate of the capacitive receive balun 148 is proximate to and aligned with a respective capacitive receive electrode 150 so that major surfaces 156 and 158 of the plates and capacitive receive electrodes 150 face one another and are separated by a distance $d_2$. In this embodiment, the areas of the major surfaces 156 and 158 are equal or near-equal, that is the dimensions of the plates of the capacitive receive balun 148 and the capacitive receive electrodes 150 are basically the same.

Turning now to FIG. 4a, the series transmit inductor ($L_{TX}$) 132 is better illustrated. As can be seen, in this embodiment, the series transmit inductor ($L_{TX}$) 132 is a flat spiral or pancake coil. The series transmit inductor ($L_{TX}$) 132 has a high quality factor (Q-factor) and is configured to create a high Q-factor resonance with the capacitive transmit electrodes ($C_{TX}$) 130 at the operating frequency ($f_s$). A high Q-factor means that the amount of energy stored is greater than the amount of energy dissipated. High Q-factor resonance increases the voltage on the capacitive transmit electrodes ($C_{TX}$) 130 compared to the applied voltage. In this embodiment, the series receive inductor ($L_{RX}$) 152 is similarly a flat spiral or pancake coil. The series receive inductor ($L_{RX}$) 152 also has a high Q-factor and is configured to create a high Q-factor resonance with the capacitive receive electrodes ($C_{RX}$) 150 at the operating frequency ($f_s$).

Figure 4C:
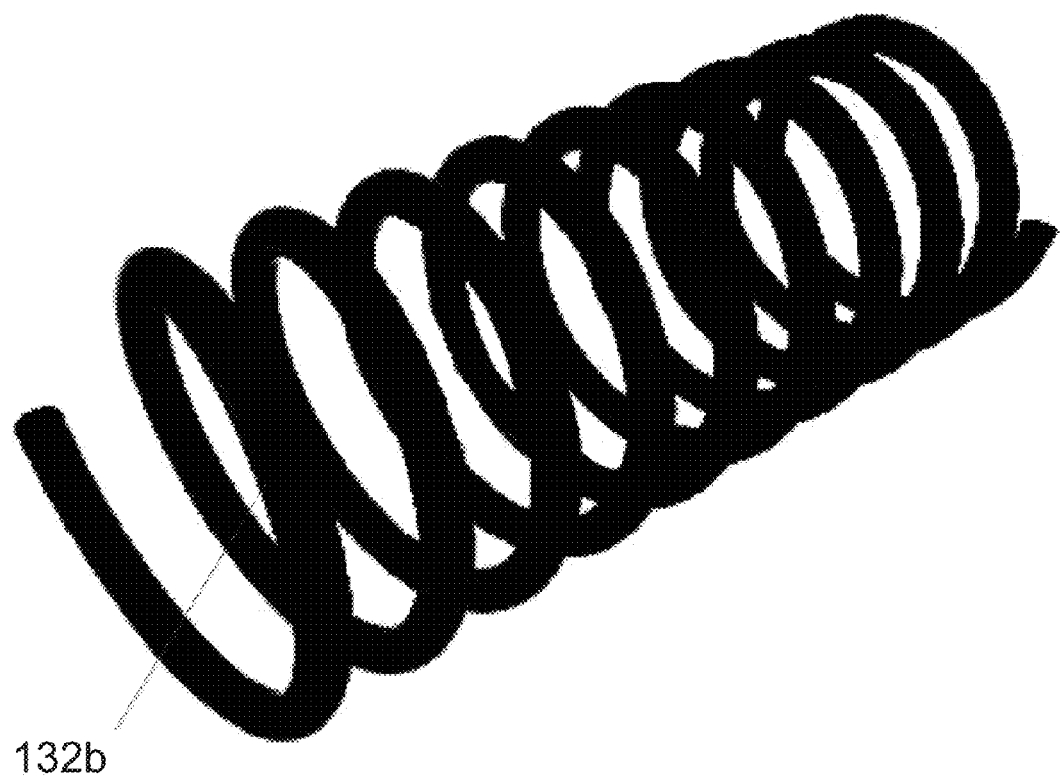
FIG. 4c is a perspective view of yet another embodiment of a series transmit inductor.

The series transmit inductor ($L_{TX}$) 132 and the series receive inductor ($L_{RX}$) 152 may however, take different forms as shown in FIGS. 4b and 4c. In FIG. 4b, the series transmit inductor ($L_{TX}$) 132 is in the form of a toroidal transmit inductor ($L_{TX}$) 132a and in FIG. 4c, the series transmit inductor is in the form of a cylindrical spiral transmit inductor ($L_{TX}$) 132b. Similar to the series transmit inductor ($L_{TX}$) 132, the series receive inductor ($L_{RX}$) 152 may also be in the form of a toroidal receive inductor ($L_{RX}$) or a cylindrical spiral receive inductor ($L_{RX}$).

The operation of the wireless electric field power transmission system 120 will now be described. During operation, the RF power source 127 comprises power source 124 and power inverter 126, and outputs an RF signal at operating frequency ($f_s$), and this RF signal is then applied across the plates of the capacitive transmit balun ($C_{drive}$) 128 thereby to excite the capacitive transmit balun ($C_{drive}$) 128. The excited capacitive transmit balun ($C_{drive}$) 128 in turn generates an electric field in a volume that surrounds the plates of the capacitive transmit balun ($C_{drive}$) 128. When the capacitive transmit resonator 134 is within the generated electric field, the capacitive transmit electrodes ($C_{TX}$) 130 and the capacitive transmit balun ($C_{drive}$) 128 resonate with the series inductor ($L_{TX}$) 132 at the operating frequency ($f_s$) thereby generating a resonant electric field that extends to the receive resonator 154.

With the receive resonator 154 in the generated resonant electric field, the capacitive receive electrodes ($C_{RX}$) 150 begin to resonate with the series receive inductor ($L_{RX}$) 152 resulting in the generation of a resonant electric field in a volume that surrounds the plates of the capacitive receive balun ($C_{load}$) 148. When the capacitive receive balun ($C_{load}$) 148 is within the generated resonant electric field, the capacitive receive balun ($C_{load}$) 148 and the capacitive receive electrodes ($C_{RX}$) 150 resonate with the series inductor ($L_{RX}$) 152 at the operating frequency ($f_s$) resulting in the capacitive receive balun ($C_{load}$) 148 outputting an RF signal that is conveyed to the RF-DC rectifier 146.

The RF-DC rectifier 146 in turn converts the RF signal to a DC signal which is then regulated at the regulator 144 and conveyed to the load 142.

Figure 5:
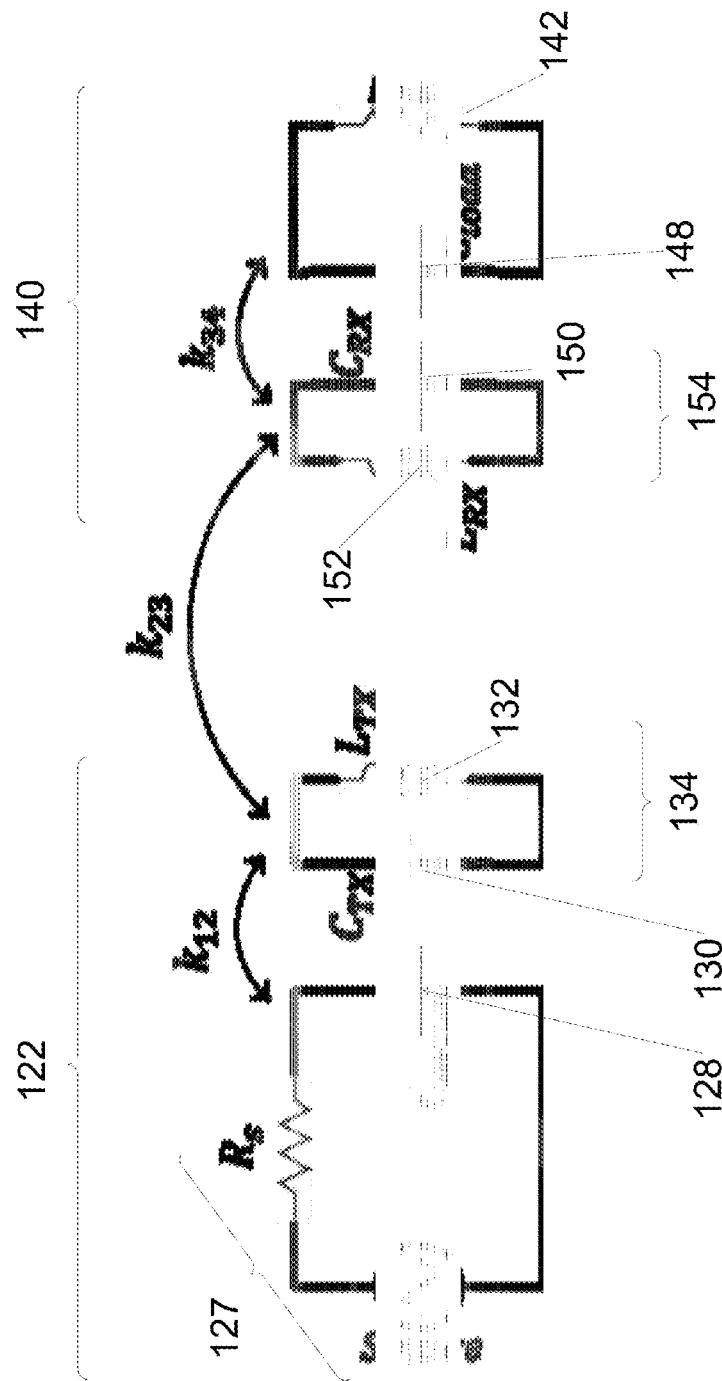
FIG. 5 is a circuit diagram equivalent of the wireless electric field power transmission system of FIG. 2.
Figure 6:
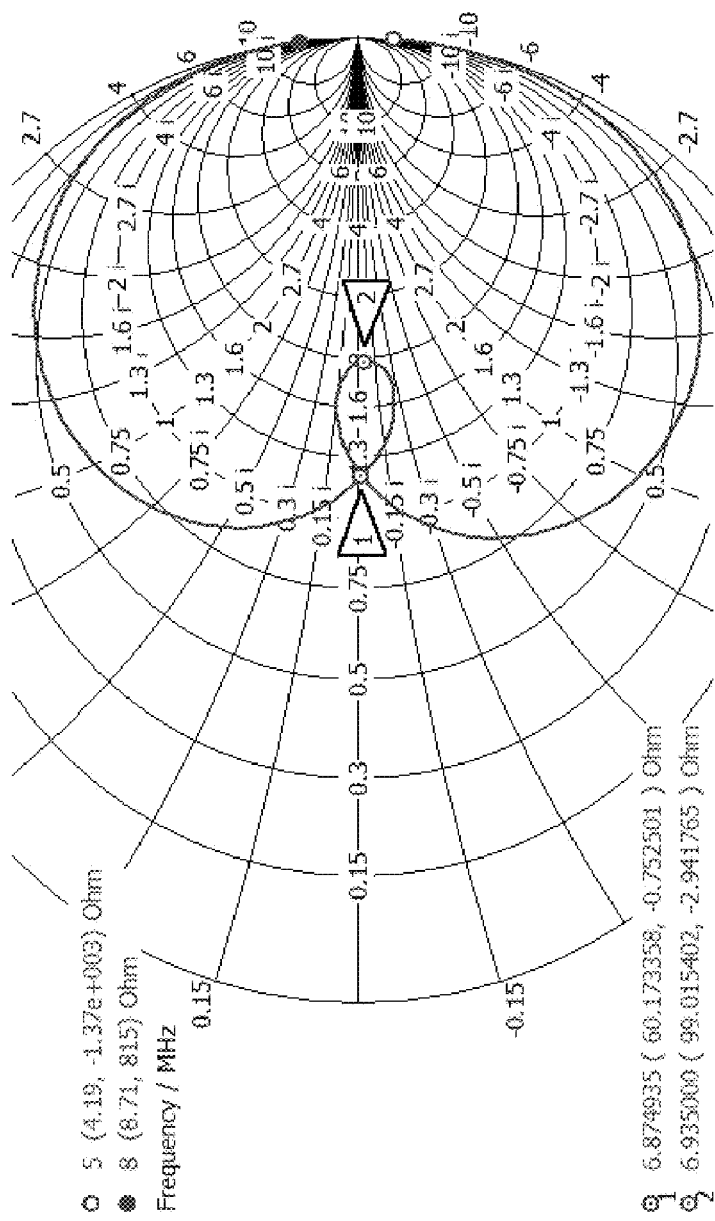
FIG. 6 is a Smith chart showing wireless electric field power transmission system impedance characteristics.

A circuit diagram equivalent of the wireless electric field power transmission system 120 is depicted in FIG. 5. As described above, the RF signal, at operating frequency ($f_s$), that is output by RF source 127 is used to excite the capacitive transmit balun ($C_{drive}$) 128 and this excitation results in the generation of an electric field that surrounds the plates of the capacitive transmit balun ($C_{drive}$) 128 and the capacitive transmit electrodes ($C_{TX}$) 130. The coupling coefficient between the capacitive transmit balun ($C_{drive}$) 128 and the capacitive transmit electrodes ($C_{TX}$) 130 is represented by $k_{12}$ and is given by:

$$k_{12} = \frac{M_{12}}{\sqrt{C_{drive} \times C_{TX}}}$$

where $M_{12}$ is the mutual capacitance between the capacitive transmit balun 128 and the capacitive transmit electrodes 130.

The coupling coefficient between the capacitive transmit electrodes 130 and the capacitive receive electrodes 150 is represented by $k_{23}$ and is given by:

$$k_{23} = \frac{M_{23}}{\sqrt{C_{TX} \times C_{RX}}}$$

where $M_{23}$ is the mutual capacitance between the capacitive transmit electrodes 130 and the capacitive receive electrodes 150.

The coupling coefficient between the capacitive receive electrodes 150 and the capacitive receive balun 148 is represented by $k_{34}$ and is given by:

$$k_{34} = \frac{M_{34}}{\sqrt{C_{RX} \times C_{load}}}$$

where $M_{34}$ is the mutual capacitance between the capacitive receive electrodes 150 and the capacitive receive balun 148.

As will be appreciated, varying the separation distances $d_1$ and $d_2$, varies the coupling coefficients by altering the mutual capacitance. Also, since the receiver 140 is in the near field of the transmitter 122, the impedance seen by the transmitter 122 varies as the separation distance $d_{TR}$ between the transmitter 122 and receiver 140 varies, resulting in a change in the resonant frequency of the wireless electric field power transmission system 120. This impedance can be adjusted to the impedance $R_S$ of the RF source 127 by varying the separation distance $d_1$ or by increasing the length of the plates of the capacitive transmit balun ($C_{drive}$) 128.

Similarly, the impedance seen by the receiver 140 also varies as the separation distance $d_{TR}$ between the transmitter 122 and receiver 140 varies. This impedance can be adjusted to the impedance of the load 142 by varying the separation distance $d_2$ or by increasing the length of the plates of the capacitive receive balun ($C_{load}$) 148.

Turning back to FIG. 3, the length overlap ($L_{ol}$) of the transmitter 122 is defined as the amount of overlap between the major surfaces 136 of the plates of the capacitive transmit balun ($C_{drive}$) 128 and the major surfaces 138 of the capacitive transmit electrodes ($C_{TX}$) 130 along the lengths of those major surfaces. The width overlap ($W_{ol}$) of the transmitter 122 is defined as the amount of overlap between the major surfaces 136 of the plates of the capacitive transmit balun ($C_{drive}$) 128 and the major surfaces 138 of the capacitive transmit electrodes ($C_{TX}$) 130 along the widths of those major surfaces.

Similarly, the length overlap ($L_{ol}$) of the receiver 140 is defined as the amount of overlap between the major surfaces 156 of the plates of the capacitive receive balun ($C_{load}$) 148 and the major surfaces 158 of the capacitive receive electrodes ($C_{RX}$) 150 along the lengths of those major surfaces. The width overlap ($W_{ol}$) of the receiver 140 is defined as the amount of overlap between the major surfaces 156 of the plates of the capacitive receive balun ($C_{load}$) 148 and the major surfaces 158 of the capacitive receive electrodes ($C_{RX}$) 150 along the widths of those major surfaces. In this embodiment, the length overlaps ($L_{ol}$) and the width overlaps ($W_{ol}$) of the transmitter 122 and receiver 140 are the same.

According to coupled mode theory, when the transmitter 122 and receiver 140 are resonating at their fundamental frequencies, the resulting operating frequency depends on the coupling between the transmitter 122 and receiver 140. If there is strong coupling then there are two modes of operation at two different frequencies. This phenomenon is referred to as frequency splitting. If the coupling is weak, then these two modes converge to a single mode of operation at a single frequency. Frequency splitting is present in simulations described below.

Figure 7:
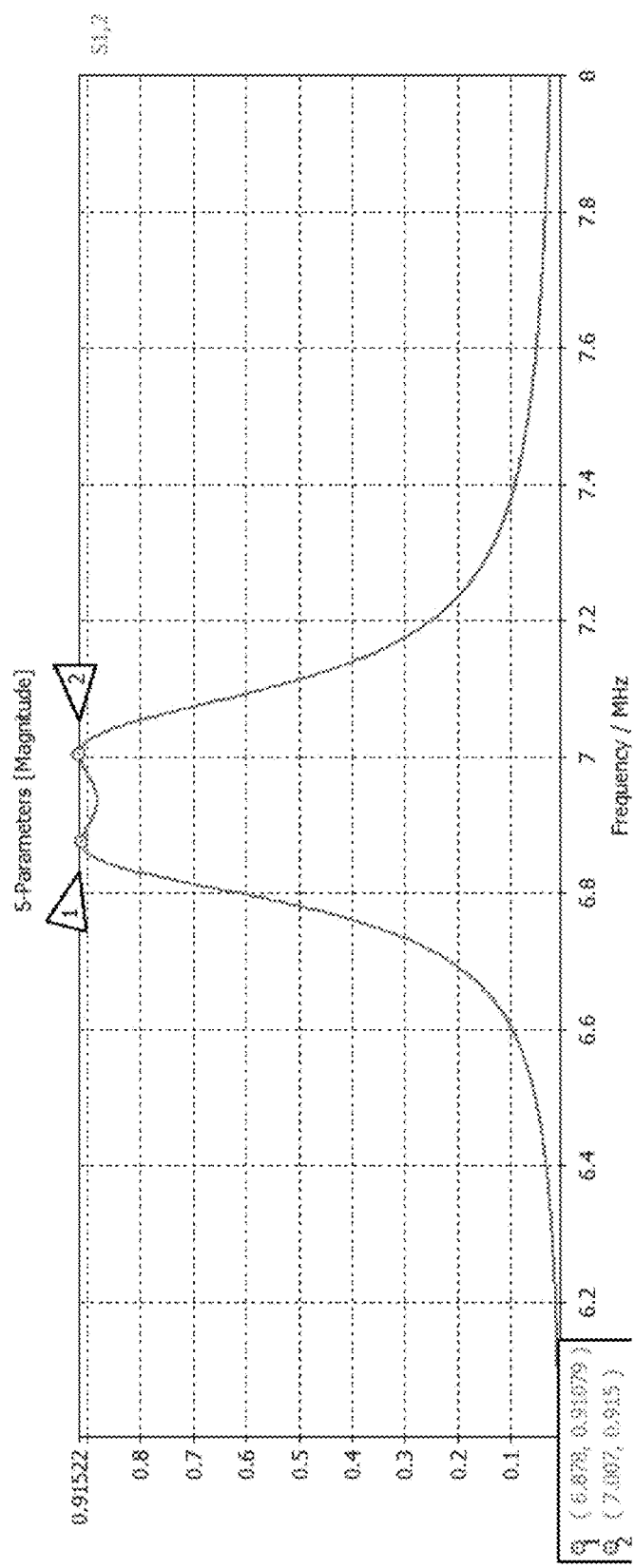
FIG. 7 is a graph of wireless electric field power transmission system power efficiency vs. frequency.

Electromagnetic field simulations using CST Microwave Studio software were performed to determine the impedance requirements of the wireless electric field power transmission system 120 at a particular operating frequency ($f_s$). FIGS. 6 to 9 show the results of the electromagnetic field simulations for determining the impedance requirements of the wireless electric field power transmission system 120 at an operating frequency ($f_s$) of 7 MHz. As shown in the Smith chart of FIG. 6, a frequency sweep from 5 to 8 MHz yields matched impedance between the transmitter 122 and receiver 140 at the points marked 1 and 2. The efficiency of the wireless electric field power transmission system 120 at these points is depicted in FIG. 7 in which the frequency at point 2 is shown to be approximately 7 MHz. The corresponding impedance requirement from the Smith chart of FIG. 6 at point 2 is approximately 99 Ohms. This impedance was achieved with separation distances $d_1$ and $d_2$ equal to 1.57 mm and length overlaps ($L_{ol}$) equal to 120 mm.

Figure 8:
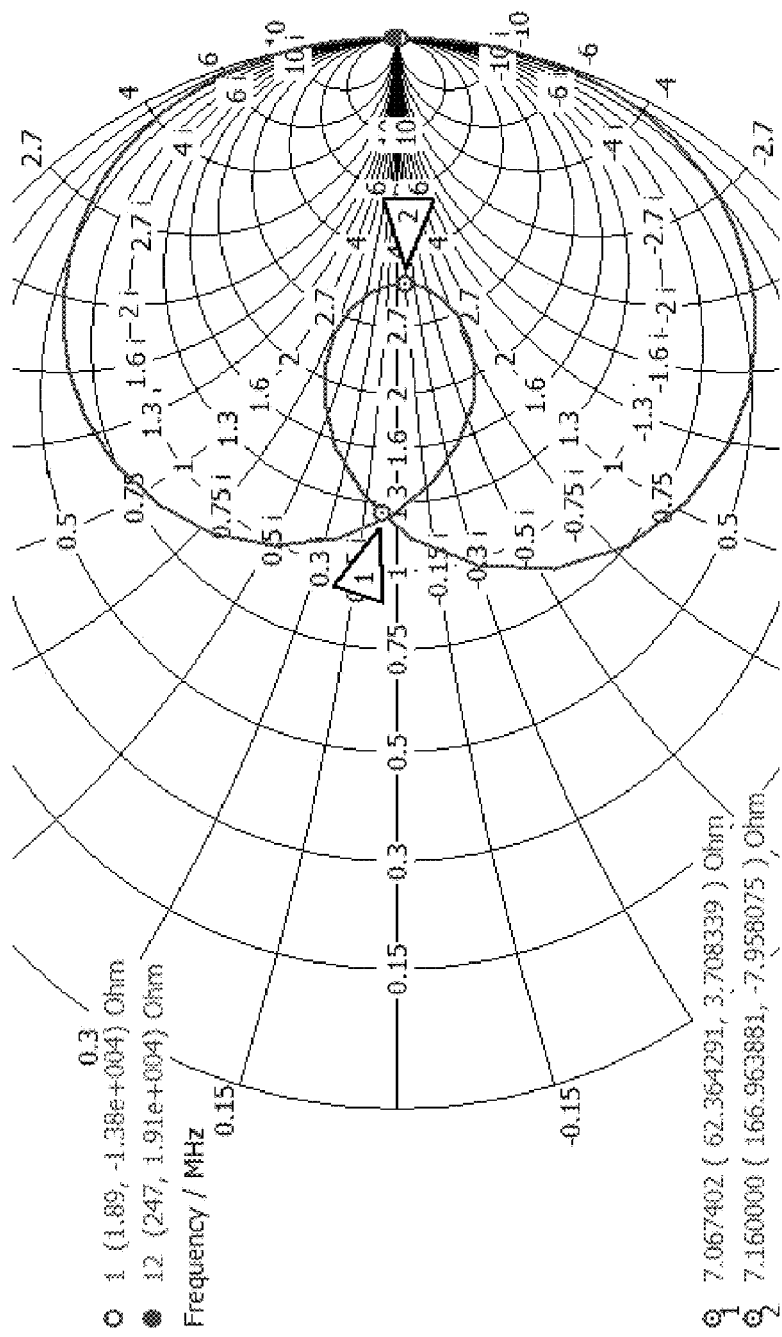
FIG. 8 is another Smith chart showing wireless electric field power transmission system impedance characteristics.
Figure 9:
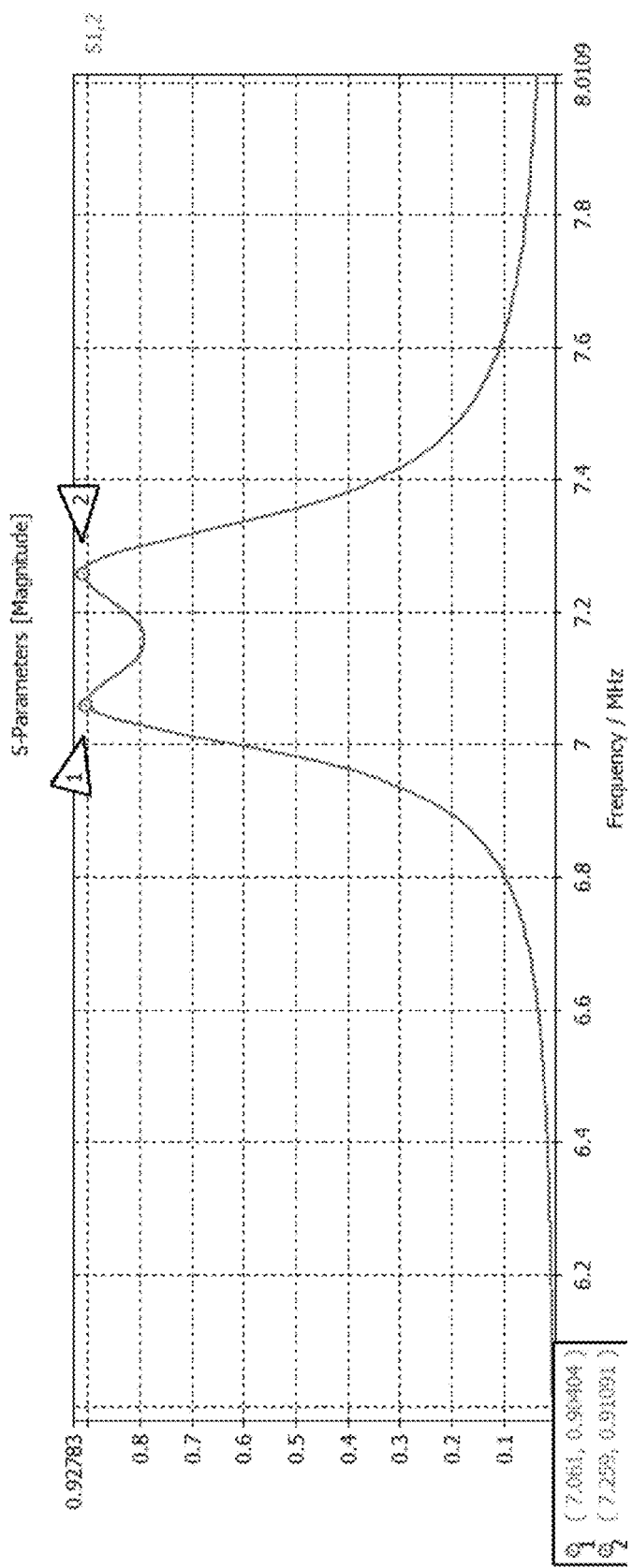
FIG. 9 is another graph of wireless electric field power transmission system power efficiency vs. frequency.

As shown in the Smith chart of FIG. 8, a frequency sweep from 1 to 12 MHz yields matched impedance between the transmitter 122 and the receiver 140 at the points marked 1 and 2. The efficiency of the wireless electric field power transmission system 120 at these points is depicted in FIG. 9 in which the frequency at point 1 is shown to be approximately 7 MHz. The corresponding impedance requirement from the Smith chart of FIG. 8 at point 1 is approximately 62 Ohms. This impedance was achieved with separation distances $d_1$ and $d_2$ equal to 0.867 mm and length overlaps ($L_{ol}$) equal to 60 mm.

In the above simulations, the widths of the plates of the capacitive transmit balun ($C_{drive}$) 128, the widths of the capacitive transmit electrodes ($C_{TX}$) 130, the widths of the plates of the capacitive receive balun ($C_{load}$) 148 and the widths of the capacitive receive electrodes ($C_{RX}$) 150 were equal. Those of skill in the art will however appreciate that these widths can be varied.

As will be appreciated from the results of the simulations, it is clear that both the resonant frequency ($f_s$) of the wireless electric field power transmission system 120 and the impedance of the transmitter 122 and receiver 140 can be matched by changing the distances $d_1$, $d_2$ and the lengths of the major surfaces 136 and 156 of the plates of the capacitive transmit balun ($C_{drive}$) 128 and the capacitive receive balun ($C_{load}$) 148, respectively.

The use of the capacitive transmit balun ($C_{drive}$) 128 and the capacitive receive balun ($C_{load}$) 148 allows the sizes of capacitive transmit electrodes ($C_{TX}$) 130 and the capacitive receive electrodes ($C_{RX}$) 150 to be reduced compared to inductive baluns since the capacitive transmit and receive baluns ($C_{drive}$) 128 and ($C_{load}$) 148 are capacitive rather than inductive and require less capacitance to reach a resonant state. The use of the capacitive transmit balun ($C_{drive}$) 128 and the capacitive receive balun ($C_{load}$) 148 also eliminates the need for inductive baluns and reduces the number of inductors required at the transmit resonator 134 and the receive resonator 154. The results in a transmitter 122 and a receiver 140 that are smaller, cheaper and simpler to design.

Figure 10:
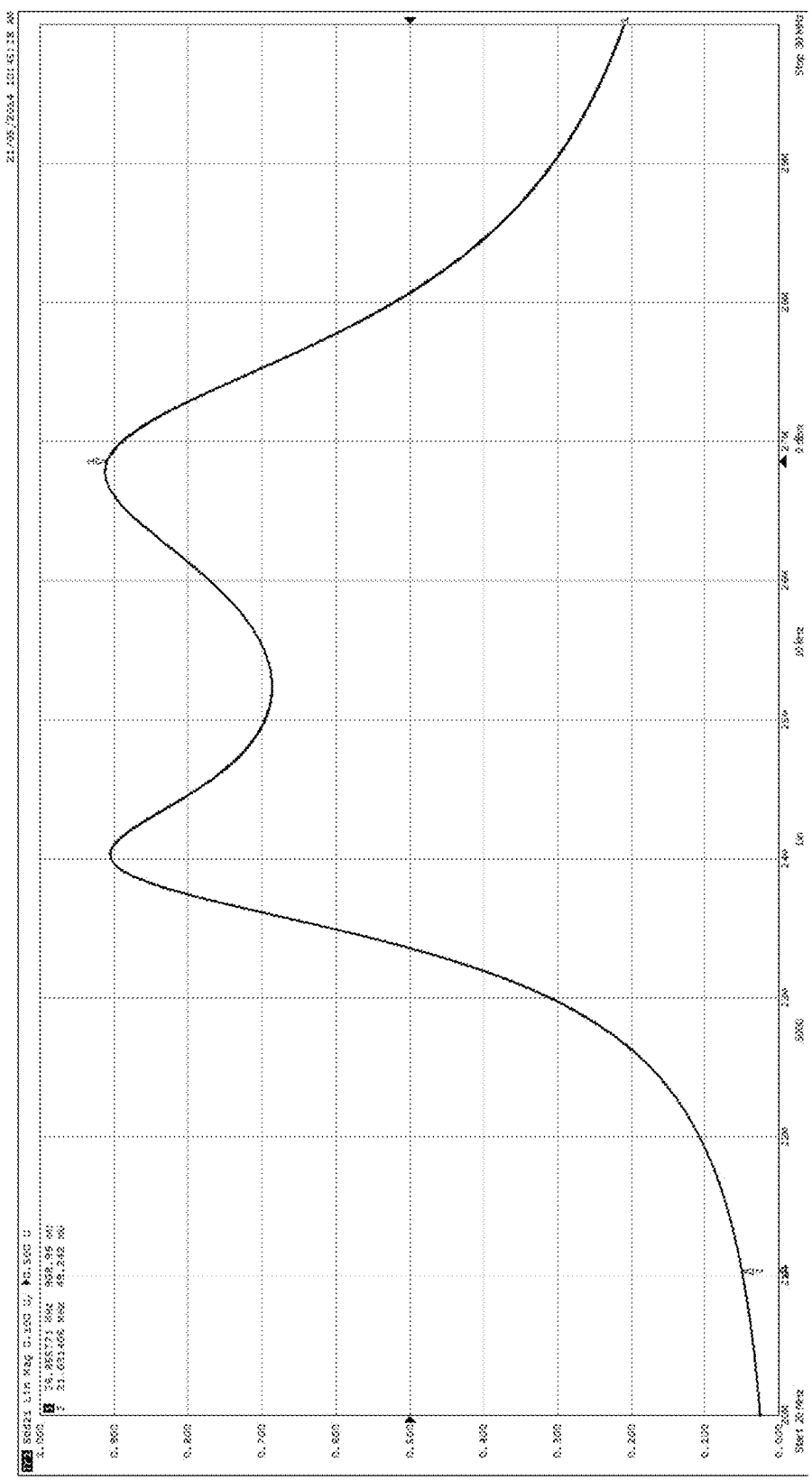
FIG. 10 is a graph of wireless electric field power transmission system efficiency vs. frequency of an exemplary system.
Figure 11:
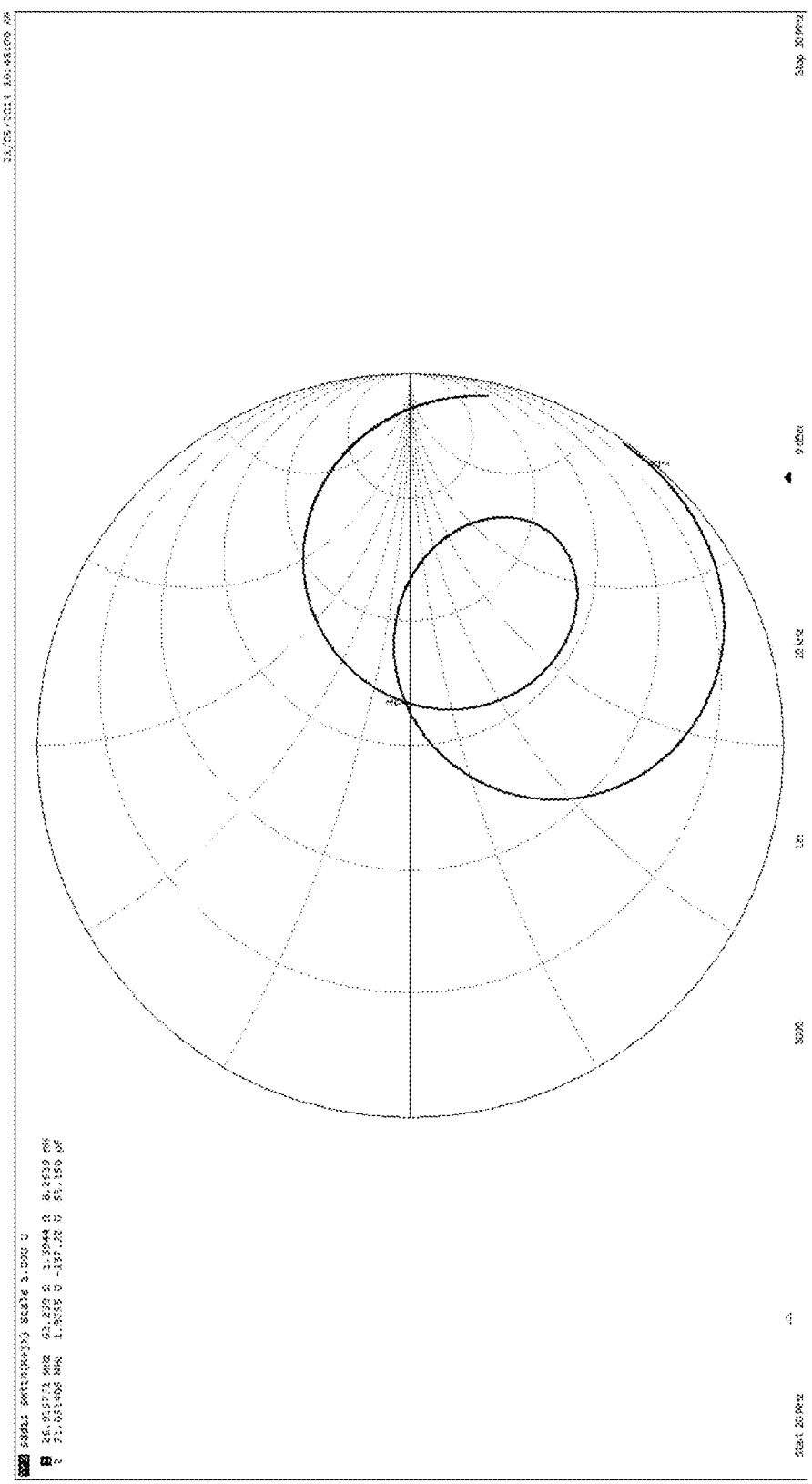
FIG. 11 is a Smith chart showing transmitter impedance characteristics of a test wireless electric field power transmission system.
Figure 12:
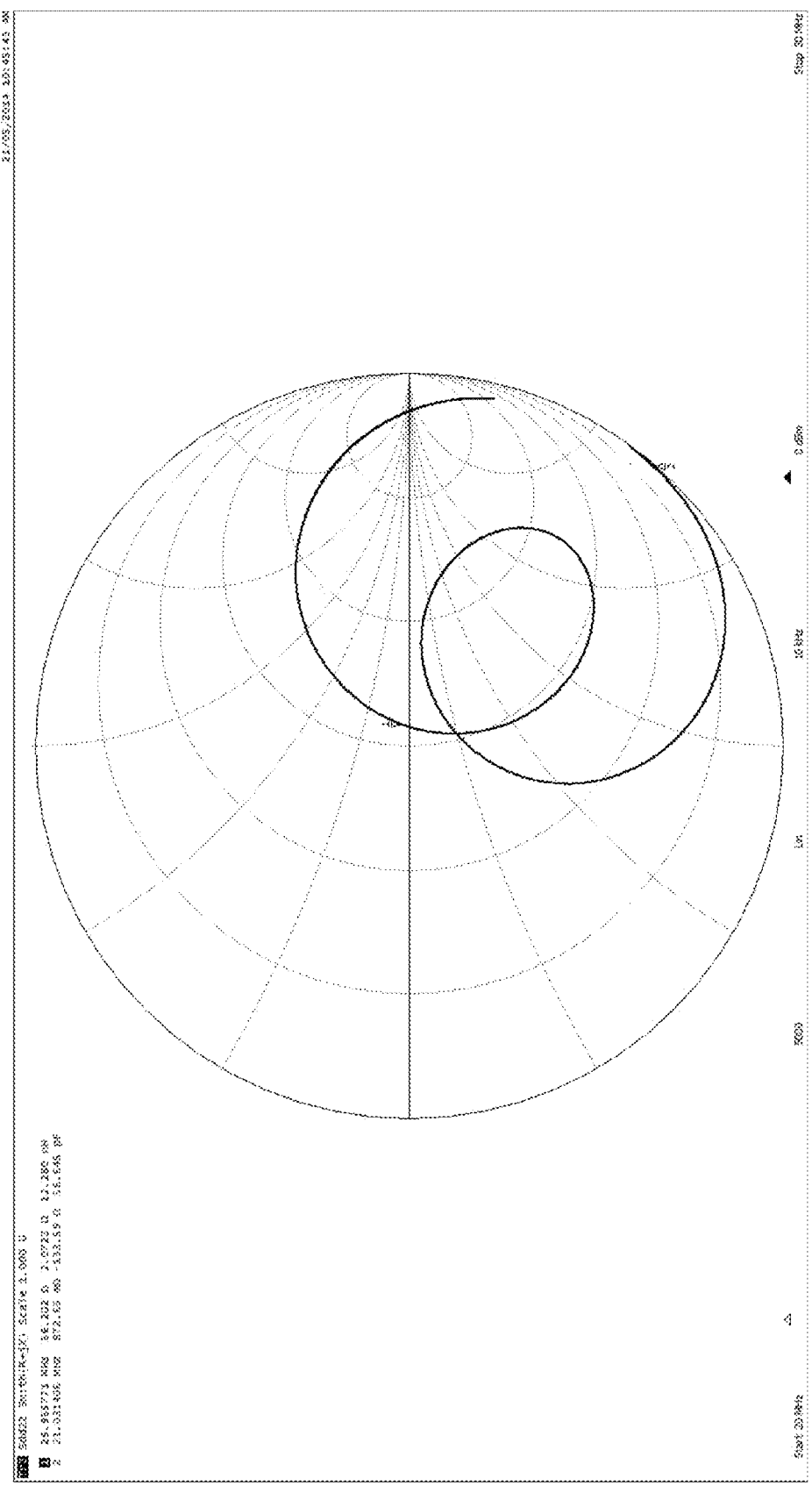
FIG. 12 is a Smith chart showing receiver impedance characteristics of the exemplary system.

An exemplary wireless electric field power transmission system in accordance with FIGS. 2 and 3 was constructed with the following parameters: an operating frequency of approximately 27 MHz and a distance $d_{TR}$ of approximately 10 cm. With regard to the transmitter, the following parameters were used: a distance of approximately 15 cm between the capacitive transmit electrodes, an electrode length of approximately 33 cm for each electrode of the capacitive transmit electrodes, a length overlap $L_{ol}$ of approximately 1.7 cm, a width overlap $W_{ol}$ of approximately 5 cm, a distance $d_1$ of approximately 0.24 cm, a series transmit inductor $L_{TX}$ having an inductance of approximately 5.9 μH, and a quality factor of approximately 300. With regard to the receiver, the following parameters were used: a distance of approximately 15 cm between the capacitive receive electrodes, an electrode length of approximately 33 cm for each electrode of the capacitive receive electrodes, a length $L_{ol}$ of approximately 2.6 cm, a width overlap $W_{ol}$ of approximately 5 cm, a distance $d_2$ of approximately 0.54 cm, a series receive inductor $L_{RX}$ having an inductance of approximately 5.1 μH, and a quality factor of approximately 250. Experimental data was collected using a Copper Mountain Technologies™ PLANAR 808/1 four port Vector Network Analyzer (VNA). The frequency was swept from 20 MHz to 30 MHz to measure the system impedances and efficiencies at various operating frequencies. As shown in FIG. 10, the frequency sweep from 20 to 30 MHz yields matched maximum efficiency between the transmitter and receiver at approximately 26.85 MHz, point 1. The corresponding impedance requirement from the Smith chart of FIG. 11 for the transmitter at point 1 is approximately 63 Ohms. The corresponding impedance requirement from the Smith chart of FIG. 12 for the receiver at point 1 is approximately 56 Ohms.

In the embodiment of FIG. 2, the plates of the capacitive transmit balun 128 and the capacitive transmit electrodes 130 have the same dimensions and are arranged so that their facing major surfaces 136 and 138 are in substantially perfect alignment. Similarly, the plates of the capacitive receive balun 148 and the capacitive receive electrodes 150 have the same dimensions and are arranged so that their facing major surfaces 156 and 158 are in substantially perfect alignment. Those of skill in the art will however appreciate that variations are possible.

Figure 13:
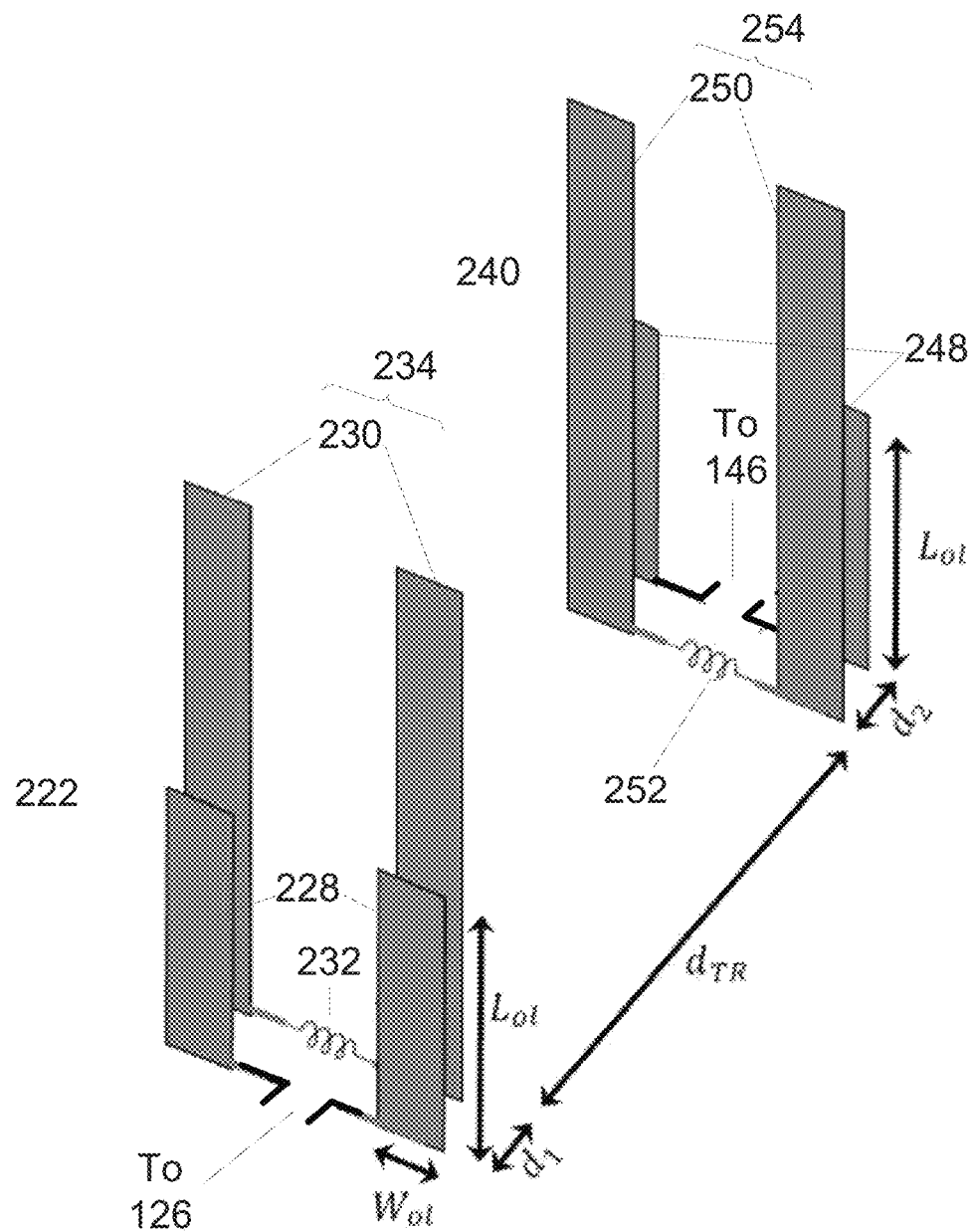
FIG. 13 is a perspective view of an alternative transmit balun, transmit resonator, receive balun and receive resonator arrangement.

For example, another embodiment of a capacitive transmit balun, capacitive transmit electrodes, capacitive receive electrodes and capacitive receive balun arrangement is shown in FIG. 13. The embodiment shown in FIG. 13 is similar to the embodiment shown in FIG. 3 and as such like components are referred to with the same reference numerals with "100" added for clarity. In this embodiment, the plates of the capacitive transmit balun 228 are shorter or smaller in dimension than the capacitive transmit electrodes 230 and the plates of the capacitive receive balun 248 are shorter or smaller in dimension than the capacitive receive electrodes 250. The change in impedance caused by the change in the lengths of the plates of the capacitive transmit balun 228 and the plates of the capacitive receive balun 248 can be offset by changing the separation distances $d_1$ and $d_2$. As with the embodiment shown in FIG. 3, the width overlaps $W_{ol}$, length overlaps $L_{ol}$, distances $d_1$ and $d_2$ and distance $d_{TR}$ may be adjusted as needed.

Figure 14:
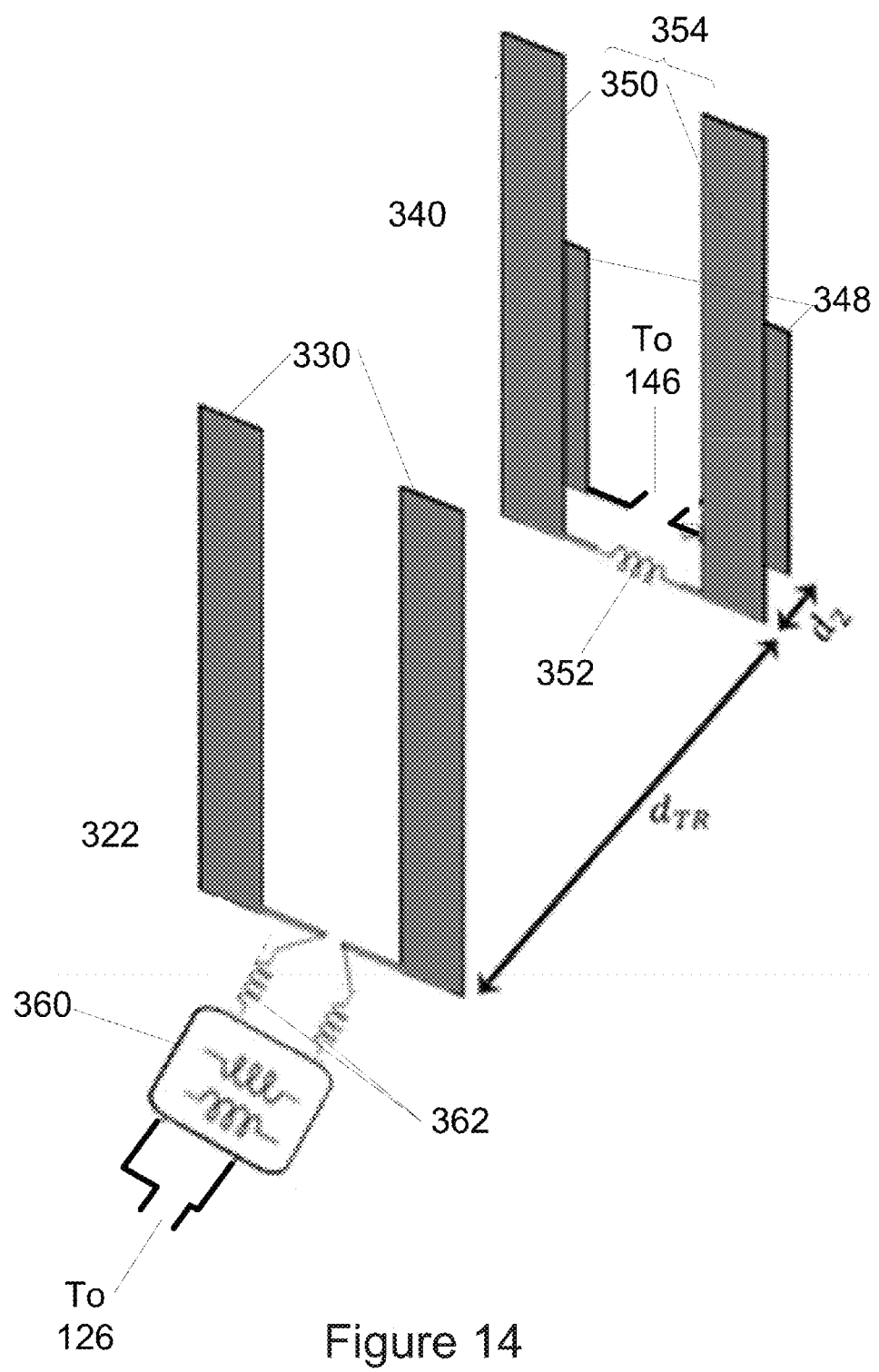
FIG. 14 is a perspective view of yet another transmit balun, transmit resonator, receive balun and receive resonator arrangement.

Still other arrangements are possible. As shown in FIG. 14, rather than using a capacitive transmit balun ($C_{drive}$) 128 to excite the capacitive transmit electrodes 130, an inductive transmit balun may be employed generally identified by reference numeral 360. The embodiment shown in FIG. 14 is similar to the embodiment shown in FIG. 3 and as such like components are referred to with the same reference numerals with "200" added for clarity. Each capacitive transmit electrode 330 is connected to the inductive transmit balun 360 via a respective series inductor 362. This makes placing the transmitter 322 on a non-flat surface more difficult since the transmit inductors 362 suffer from a loss of inductance and a reduction in quality factor (Q) if they are bent to conform to non-flat surfaces.

Similar to the embodiment of FIG. 13, in this embodiment, the plates of the capacitive receive balun 348 are shorter or smaller in dimension than the capacitive receive electrodes 350. Those of skill in the art will however appreciate that the plates of the capacitive receive balun 348 may be similar in dimension to the capacitive receive electrodes 350. Also, rather than replacing the capacitive transmit balun 128 with an inductive transmit balun 360, a capacitive transmit balun may be employed and the capacitive receive balun 348 may be replaced with an inductive receive balun.

Figure 15:
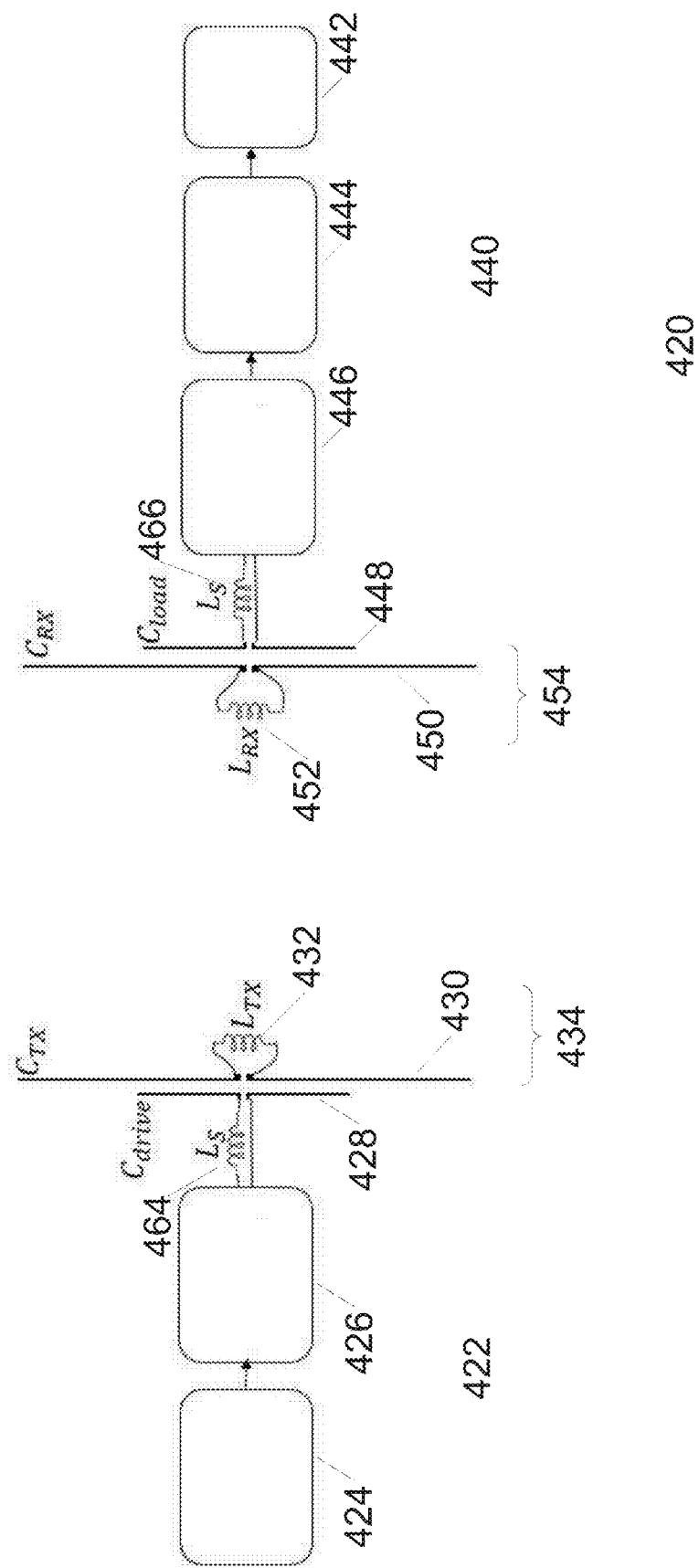
FIG. 15 is a schematic layout of another embodiment of a wireless electric field power transmission system.
Figure 16:
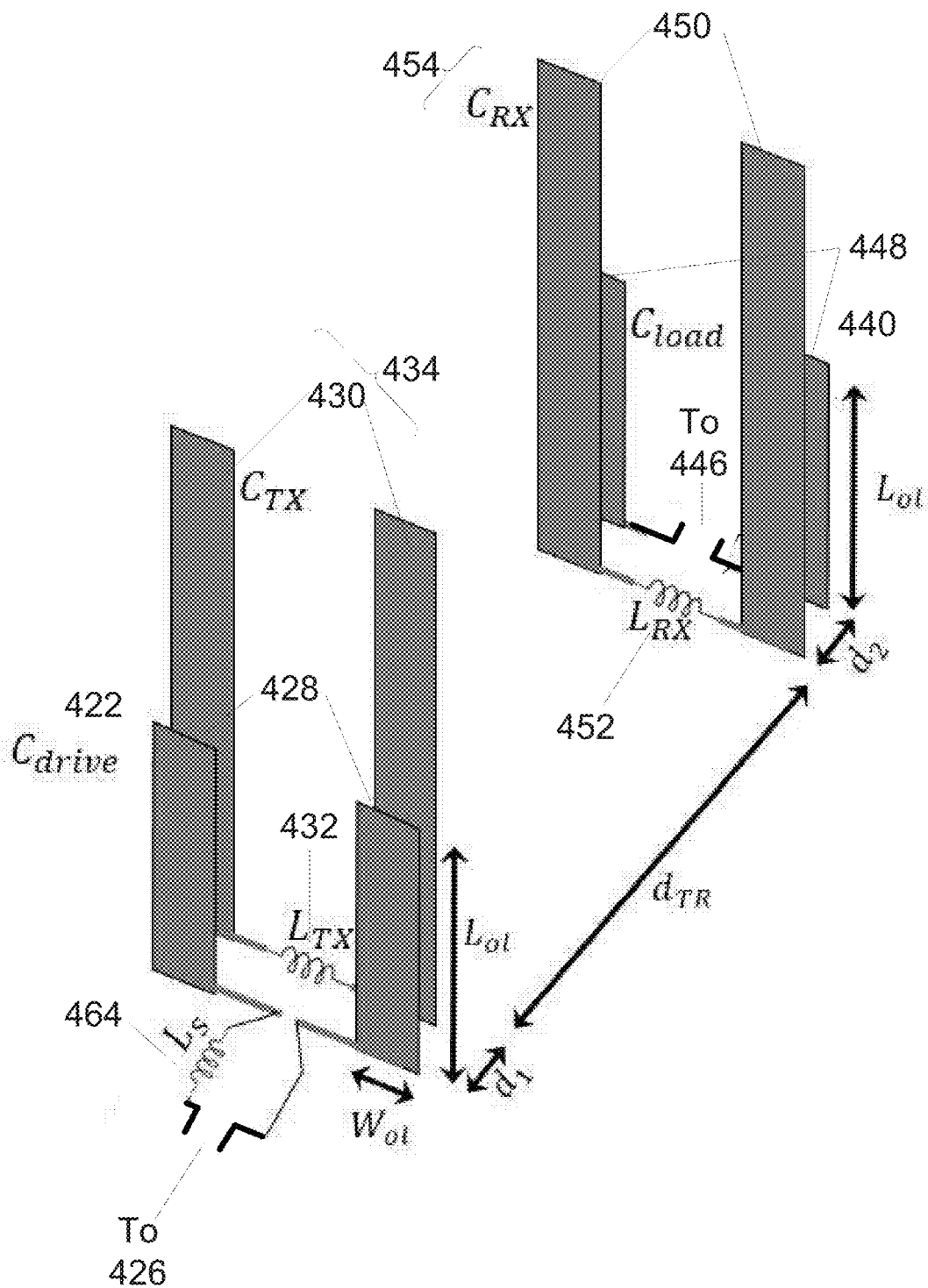
FIG. 16 is a perspective view of a transmit balun, transmit resonator, receive balun and receive resonator arrangement forming part of the wireless electric field power transmission system of FIG. 15.

Turning now to FIGS. 15 and 16, another embodiment of a wireless electric field power transmission system is shown that is similar to the embodiment shown in FIG. 2 and as such like components are referred to with the same reference numerals with "300" added for clarity. In this embodiment, the transmitter 422 and receiver 440 further comprise series inductors ($L_s$) for additional impedance and resonance control. As can be seen, in the transmitter 422, the power inverter 426 is connected directly to one plate of the capacitive transmit balun 428 ($C_{drive}$) and is connected to the other plate of the capacitive transmit balun 428 ($C_{drive}$) via a series inductor ($L_s$) 464.

In the receiver 440, the RF-DC rectifier 446 is connected directly to one plate of the capacitive receive balun ($C_{load}$) 448 and is connected to the other plate of the capacitive receive balun 448 via a series inductor (Ls) 466. The configurations of the plates of the capacitive transmit balun and capacitive transmit electrodes and the plates of the capacitive receive baluns and capacitive receive electrodes as shown are similar to the arrangement of FIG. 13. Those of skill in the art will however appreciate that the configurations of the plates of the capacitive transmit balun and capacitive transmit electrodes and the plates of the capacitive receive baluns and capacitive receive electrodes may vary and for example, take the form similar to the arrangement of FIG. 3. The various dimensions comprising width overlaps $W_{ol}$, length overlaps $L_{ol}$, distances $d_1$ and $d_2$ and distance $d_{TR}$ may be adjusted as needed.

During operation, the power inverter 426 when driven by the power source 424 outputs an RF signal at operating frequency ($f_s$), and this RF signal is then applied across the plates of the capacitive transmit balun ($C_{drive}$) 428 thereby to excite the capacitive transmit balun ($C_{drive}$) 428. The excited capacitive transmit balun ($C_{drive}$) 428 resonates with the series inductor ($L_s$) 464 at the operating frequency ($f_s$) thereby generating a resonant electric field. When the capacitive transmit resonator 434 is within the generated resonant electric field, the capacitive transmit electrodes ($C_{TX}$) 430 and the capacitive transmit balun ($C_{drive}$) 428 resonate with the series inductor ($L_{TX}$) 432 and ($L_s$) 464 at the operating frequency ($f_s$) thereby generating a resonant electric field that extends to the receive resonator 454.

With the receive resonator 454 in the generated resonant electric field, the capacitive receive electrodes ($C_{RX}$) 450 begin to resonate with the series receive inductor ($L_{RX}$) 452 resulting in the generation of a resonant electric field in a volume that surrounds the plates of the capacitive receive balun ($C_{load}$) 448. When the capacitive receive balun ($C_{load}$) 448 is within the generated resonant electric field, the capacitive receive balun ($C_{load}$) 448 and the capacitive receive electrodes ($C_{RX}$) 450 resonate with the series inductor ($L_{RX}$) 152 at the operating frequency ($f_s$) resulting in the capacitive receive balun ($C_{load}$) 448 outputting an RF signal that is conveyed to the RF-DC rectifier 446.

Figure 17:
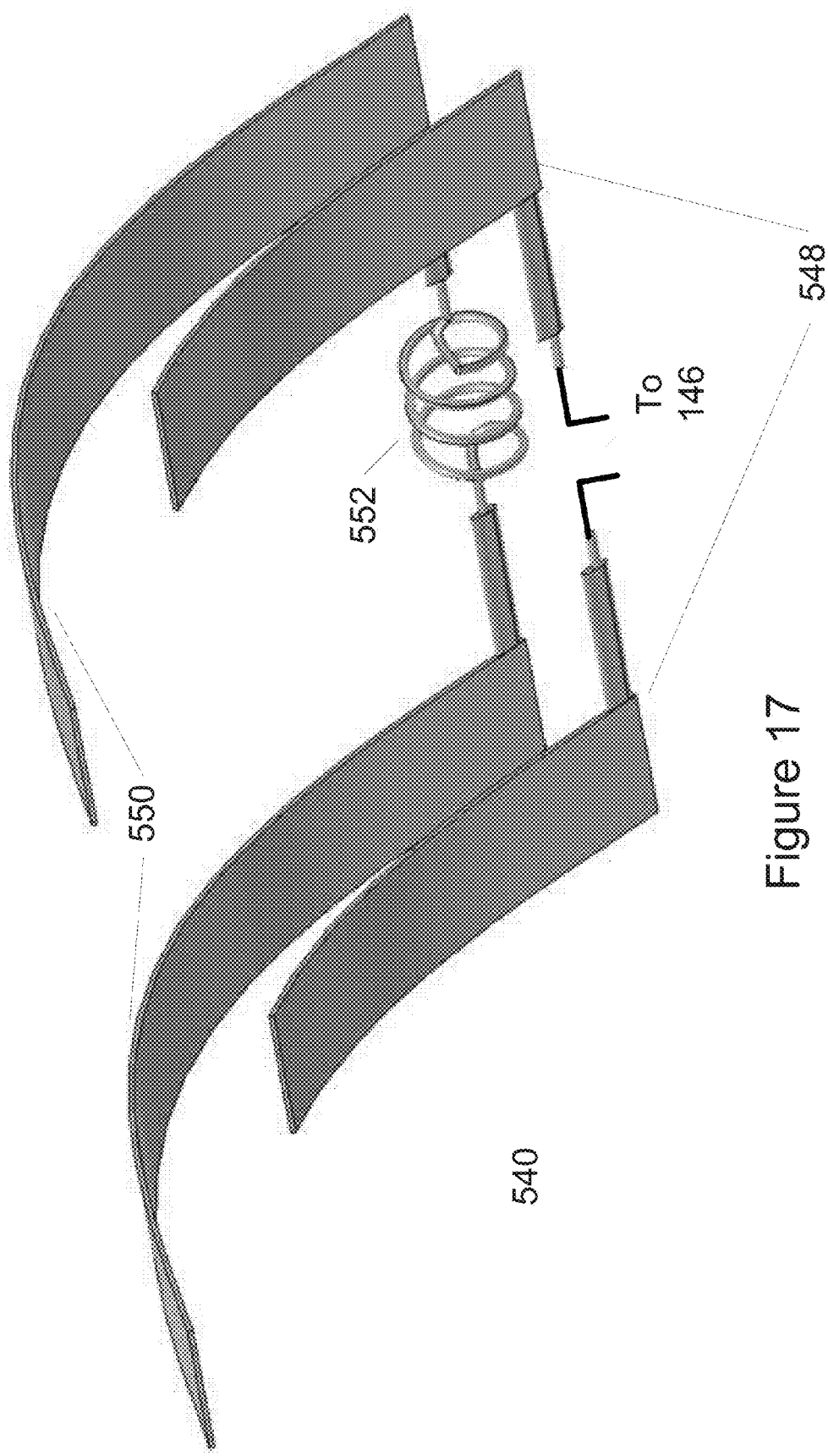
FIG. 17 is a perspective view of another embodiment of a receiver forming part of the wireless field power transmission system of FIG. 2.

FIG. 17 depicts an alternative capacitive receive electrode and capacitive receive balun arrangement. This embodiment is similar to the receiver 140 of the embodiment shown in FIG. 3 and as such like components are referred to with the same reference numerals with "400" added for clarity. Similar to the arrangement of FIG. 13, the plates of the capacitive receive balun 548 are shorter or smaller in dimension than the capacitive receive electrodes 550 although if desired the plates of the capacitive receive balun 548 and the capacitive receive electrodes 550 may be of the same dimension. In this embodiment however, rather than being planar, the plates of the capacitive receive balun 548 and the capacitive receive electrodes 550 are curved.

Those of skill in the art will appreciate that the curved plate and electrode arrangement can be applied to the transmitter.

Figure 18:
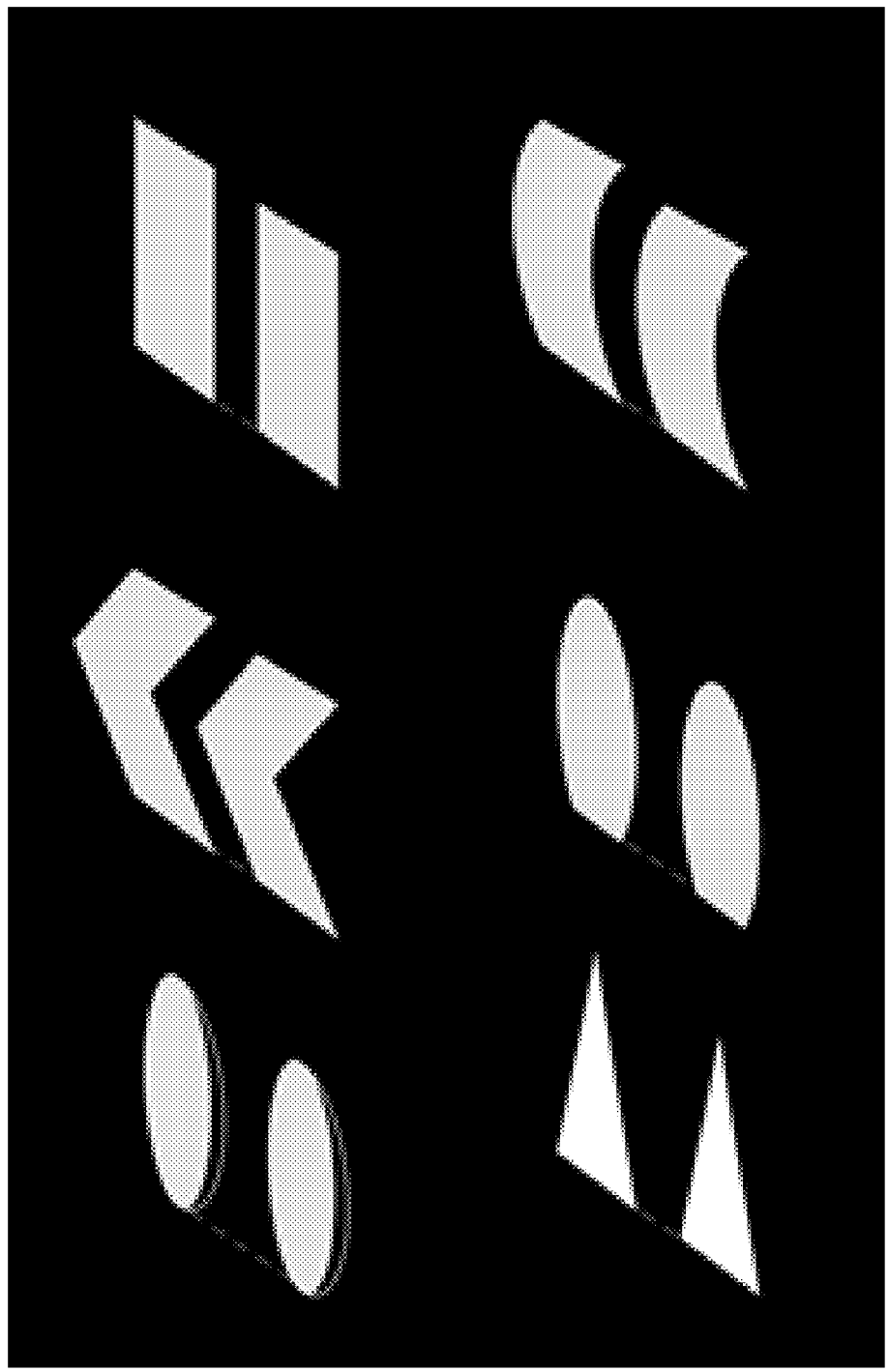
FIG. 18 is a perspective view showing various configurations for conductive elements for use in capacitive transmit and receive baluns.

While the conductive elements of the capacitive transmit and receive baluns and the capacitive transmit and receive electrodes have been shown and described as taking the form of generally rectangular parallel plates, those of skill in the art will appreciate that alternatives are possible. The conductive elements of the capacitive transmit and receive baluns and the capacitive transmit and receive electrodes may take various forms. For example, FIG. 18 depicts various geometrical shapes for the conductive elements of the capacitive transmit and receive baluns and the capacitive transmit and receive electrodes. As can be seen, the conductive elements of the capacitive transmit and receive baluns and electrodes can have a square shape, an arrow shape, a convex circular shape, a rhombus shape with curved sides, a circular shape or a triangular shape. As will be appreciated, the conductive elements of the capacitive transmit and receive baluns and the capacitive transmit and receive electrodes may be angled, curved and/or textured in various configurations.

Although the wireless electric field power transmission system is shown as comprising a pair of capacitive transmit electrodes and a pair of capacitive receive electrodes, those of skill in the art will appreciate that more than two capacitive transmit electrodes and more than two capacitive receive electrodes may be employed. Increasing the number of capacitive transmit electrodes ($C_{TX}$) 130 and increasing the number of capacitive receive electrodes ($C_{RX}$) 150 reduces Eddy current loss.

Those of skill in the art will appreciate that the wireless power transmission system can be used in a variety of applications including those identified in above-incorporated U.S. patent application Ser. No. 13/607,474. Further, applications include, but are not limited to, integrating parts or all of the wireless power transmission system into: a backpack, a vehicle (e.g. fire truck, bus, military vehicles, Unmanned Autonomous Vehicles (UAVs) electric car and hybrid car), a radio communication device, a military base camp, an airplane, a table, a computer (e.g. laptop, desktop and tablet computer), a container, a flat surface (e.g. tables, desks, counters, shelves, walls, floors, ceilings and doors), a phone (e.g. cordless, mobile and cellular), a television set or display panel (e.g. Plasma, LCD, LED and OLED), home electronics (e.g. DVD players, Blu-ray players, receivers, amplifiers, all-in-one home theatre, speakers, sub-woofers, video game consoles, video game controllers, remote control devices, televisions, computers or other monitors, digital cameras, video cameras, digital photo frames, video or image projectors and media streaming devices), and a public space or common area.

Although wireless electric field power transmission systems are shown as comprising a power source connected to a power inverter with the power inverter outputting an RF signal that excites the capacitive balun, those of skill in the art will appreciate that other configurations are possible. For example, the power inverter may be omitted and a power source that outputs an alternating or RF signal to excite the capacitive balun may be employed.

Although embodiments have been described above with reference to the figures, those of skill in the art will appreciate that variations and modifications may be made without departing from the scope thereof as defined by the appended claims.

What is claimed is:

1. A wireless electric field power transmission system comprising:
   a transmitter comprising a transmit resonator and a transmit capacitive balun; and
   at least one receiver comprising a receive resonator and a receive capacitive balun, wherein, via resonant electric field coupling:
      the transmit capacitive balun is configured to transfer power to the transmit resonator,
      in response, the transmit resonator is configured to transfer power to the receive resonator, and
      the receive capacitive balun is configured to extract power from the receive resonator.

2. A method of wirelessly transferring power, the method comprising:
   delivering power from a source to a transmit resonator via a transmit capacitive balun via electric field coupling;
   in response, transferring power from the transmit resonator to a receive resonator via electric field coupling; and
   extracting power from the receive resonator via a receive capacitive balun via electric field coupling.

3. A transmitter for wirelessly transferring power, the transmitter comprising:
   a capacitive balun configured to receive an alternating signal and in response generate an electric field; and
   a transmit resonator, responsive to the electric field generated by the capacitive balun, configured to resonate with the capacitive balun and generate an electric field, wherein the capacitive balun and the transmit resonator are configured to transfer power to a receiver via resonant electric field coupling.

4. The transmitter of claim 3, wherein the transmit resonator comprises laterally spaced electrodes interconnected by a series inductor.

5. The transmitter of claim 4, wherein said capacitive balun comprises laterally spaced conductive elements, each conductive element being proximate to and spaced from at least one respective electrode.

6. The transmitter of claim 5, wherein the conductive elements and electrodes are in substantial alignment so that major faces of the conductive elements and electrodes face one another.

7. The transmitter of claim 5, wherein the conductive elements and electrodes are generally planar.

8. The transmitter of claim 5, wherein the conductive elements and electrodes are curved, angled and/or textured.

9. The transmitter of claim 5, wherein the conductive elements and electrodes have substantially similar dimensions.

10. The transmitter of claim 5, wherein the conductive elements and electrodes are of different dimensions and/or different geometries.

11. The transmitter of claim 3, further comprising a power inverter connected across the capacitive balun, said power inverter configured to output the alternating signal that excites the capacitive balun.

12. The transmitter of claim 3, further comprising a source configured to generate the alternating signal that excites the capacitive balun.

13. The transmitter of claim 3, wherein the alternating signal is a radio frequency (RF) signal.

14. A receiver for wirelessly receiving power, the receiver comprising:
   a receive resonator; and
   a capacitive balun capacitively coupled to the receive resonator, wherein the receive resonator and the capacitive balun are configured to resonate in response to a generated electric field, and wherein the capacitive balun is configured to extract power via resonant electric field coupling and to output an alternating signal in response to resonance of the receive resonator and the capacitive balun.

15. The receiver of claim 14, wherein the receive resonator comprises laterally spaced electrodes interconnected by a series inductor.

16. The receiver of claim 15, wherein said capacitive balun comprises laterally spaced conductive elements, each capacitive element being proximate to and spaced from at least one respective electrode.

17. The receiver of claim 16, wherein the conductive elements and electrodes are in substantial alignment so that major faces of the conductive elements and electrodes face one another.

18. The receiver of claim 16, wherein the conductive elements and electrodes are generally planar.

19. The receiver of claim 16, wherein the conductive elements and electrodes are curved, angled and/or textured.

20. The receiver of claim 16, wherein the conductive elements and electrodes have substantially similar dimensions.

21. The receiver of claim 16, wherein the conductive elements and electrodes are of different dimensions and/or different geometries.

22. The receiver of claim 14, further comprising a rectifier configured to convert the alternating signal to a direct current signal.

23. The receiver of claim 22, further comprising a regulator configured to regulate the direct current signal.

* * * * *